(12) United States Patent
Fu et al.

(10) Patent No.: US 10,346,728 B2
(45) Date of Patent: Jul. 9, 2019

(54) NODULE DETECTION WITH FALSE POSITIVE REDUCTION

(71) Applicant: Hitachi, Ltd., Tokyo (JP)

(72) Inventors: Maojing Fu, Sunnyvale, CA (US); Hsiu-Khuern Tang, San Jose, CA (US); Abhay Mehta, Austin, TX (US)

(73) Assignee: Hitachi, Ltd., Tokyo (JP)

( * ) Notice: Subject to any disclaimer, the term of this patent is extended or adjusted under 35 U.S.C. 154(b) by 70 days.

(21) Appl. No.: 15/794,369

(22) Filed: Oct. 26, 2017

(65) Prior Publication Data

US 2019/0130228 A1 May 2, 2019

(51) Int. Cl.
| | |
|---|---|
| *G06K 9/66* | (2006.01) |
| *G06K 9/62* | (2006.01) |
| *G06N 3/00* | (2006.01) |
| *G06N 20/00* | (2019.01) |

(52) U.S. Cl.
CPC .............. *G06K 9/66* (2013.01); *G06K 9/6269* (2013.01); *G06N 20/00* (2019.01)

(58) Field of Classification Search
CPC ......... G06K 9/66; G06K 9/6269; G06N 20/00
See application file for complete search history.

(56) References Cited

U.S. PATENT DOCUMENTS

| | | | |
|---|---|---|---|
| 6,819,790 B2 | 11/2004 | Suzuki et al. | |
| 7,545,965 B2 | 6/2009 | Suzuki et al. | |
| 2007/0019548 A1 | 1/2007 | Krishnamurthy | |
| 2007/0110292 A1* | 5/2007 | Bi | G06K 9/6256 382/128 |

(Continued)

FOREIGN PATENT DOCUMENTS

| | | |
|---|---|---|
| GB | 2463906 A | 3/2010 |
| JP | 2012-504003 A | 2/2012 |
| WO | 2016/201575 A1 | 12/2016 |

OTHER PUBLICATIONS

Riccardi et al, Computer-aided detection of lung nodules via 3D fast radial transform, scale space representation, and Zernike MIP classification, 2011, Med. Phys. 38 (4), pp. 1962-1971 (Year: 2011).*

(Continued)

*Primary Examiner* — David F Dunphy
(74) *Attorney, Agent, or Firm* — Mattingly & Malur, PC

(57) ABSTRACT

In some examples, a system may train a false positive reduction machine learning model (MLM) for nodule detection. The system may receive training data images including negative images and positive images, along with an indication of nodule locations in the positive images. The system may determine elliptical approximations for nodules in the positive images, and may determine respective binarized contours from the elliptical approximations. Further, the system may determine an elliptical approximation space for the binarized contours, and may determine a subspace angle between individual image samples in the positive images and the elliptical approximation space as at least one feature of the MLM. Subsequently, when applying the MLM during nodule detection, one or more images may be input to the MLM to determine whether an indication of a nodule is correct, and if so, a visualization of a location of the nodule may be provided.

20 Claims, 15 Drawing Sheets

(56) References Cited

U.S. PATENT DOCUMENTS

2009/0175514 A1* 7/2009 Zhao .................... G06K 9/6228
  382/128
2018/0353149 A1* 12/2018 Madabhushi ........ A61B 5/7267
2019/0050981 A1* 2/2019 Song .................... G06T 7/0012

OTHER PUBLICATIONS

Lo et al, "Extraction of Rounded and Line Objects for the Improvement of Medical Image Pattern Recognition", 1994, Proceedings of 1994 IEEE Nuclear Science Symposium—NSS'94, vol. 4, pp. 1802-1806 (Year: 1994).*
Messay et al, "Segmentation of pulmonary nodules in computed tomography using a regression neural network approach and its application to the Lung Image Database Consortium and Image Database Resource Initiative dataset", 2015, Medical Image Analysis 22, pp. 48-62 (Year: 2015).*
C Bradford Barber, et al., "The Quickhull Algorithm for Convex Hulls", ACM Transactions on Mathematical Software, vol. 22, No. 4, Dec. 1996, pp. 469-483. http://www.acm.org/pubs/toc/Abstracts/toms/235821.html.

* cited by examiner

| Feature Number | Feature Category | Feature Name | Feature Definition |
|---|---|---|---|
| 1 | Angle to Elliptical Approximation Space | angle_ellip_approx | The subspace angle to the elliptical approximation space |
| 2~7 | Grayscale Distribution Features | grayscale_values, grayscale_min, grayscale_max, grayscale_mode, grayscale_median, grayscale_std | The voxel values, minimum, maximum, mode, median, and standard deviation of grayscale values of the image patch of interest |
| 8~11 | Geometry Features | geo_minor_axes, geo_major_axes, geo_compactness, geo_euler_number | The minor and major axes lengths of elliptical object that approximates the nodule, the compactness (ratio of the volume of the nodule within the elliptical object), and the Euler characteristic number |
| 12 | Histogram of Oriented Gradients Features | hog_features | The histogram of oriented gradient features from the image patch of interest |
| 13~15 | Hessian Matrix Based Features | hessian_eigen_min, hessian_eigen_max, hessian_eigen_ratio | The minimum and maximum eigenvalues obtained from the Hessian matrix of the image patch of interest, and the ratio of the two eigenvalues |
| 16 | Local Binary Pattern Features | lbp_features | The local binary pattern features from the image patch of interest |

FIG. 13

NODULE DETECTION WITH FALSE POSITIVE REDUCTION

BACKGROUND

Lung cancer is the leading cause of cancer death. Detecting lung cancer early can significantly improve the prognosis for a patient. A lung tumor or other abnormal growth may be the result of abnormal rates of cell division and/or abnormal cell death in lung tissues. Computer-assisted detection of lung tumors and other abnormal growths (referred to hereinafter as "nodules") using computed tomography (CT) and/or other imaging techniques has proven useful for detection, diagnosis, and monitoring of lung cancer. Accordingly, computer-assisted detection of lung nodules is a valuable tool in lung cancer screening programs. However, existing techniques for automatic nodule detection in images often suffer from limited sensitivity, high false positive rates, and poor generality across different types of lung nodules.

SUMMARY

Some implementations include arrangements and techniques for reducing false positives during automated nodule detection. For example, a computer system may train a false positive reduction machine learning model (MLM) for use during nodule detection. The system may receive training data images including negative images and positive images, along with an indication of nodule locations in the positive images. In some cases, Voronoi tessellation may be used to perform informed sampling of the negative images when creating a training data set and/or data augmentation may be performed on one or more of the positive images when creating the training data set.

In some examples, the system may determine elliptical approximations for nodules in the positive images, and may determine respective binarized contours from the elliptical approximations. Further, the system may determine an elliptical approximation space for the binarized contours, and may determine a subspace angle between individual image samples in the positive images and the elliptical approximation space as at least one feature of the MLM. Subsequently, when applying the MLM during nodule detection, one or more patient images may be input to the MLM to determine whether an indication of a nodule location is correct, and if so, a visualization of the location of the nodule may be provided.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 13 illustrates an example data structure summarizing features that may be extracted from image patches according to some implementations.

DETAILED DESCRIPTION

Figure 1:
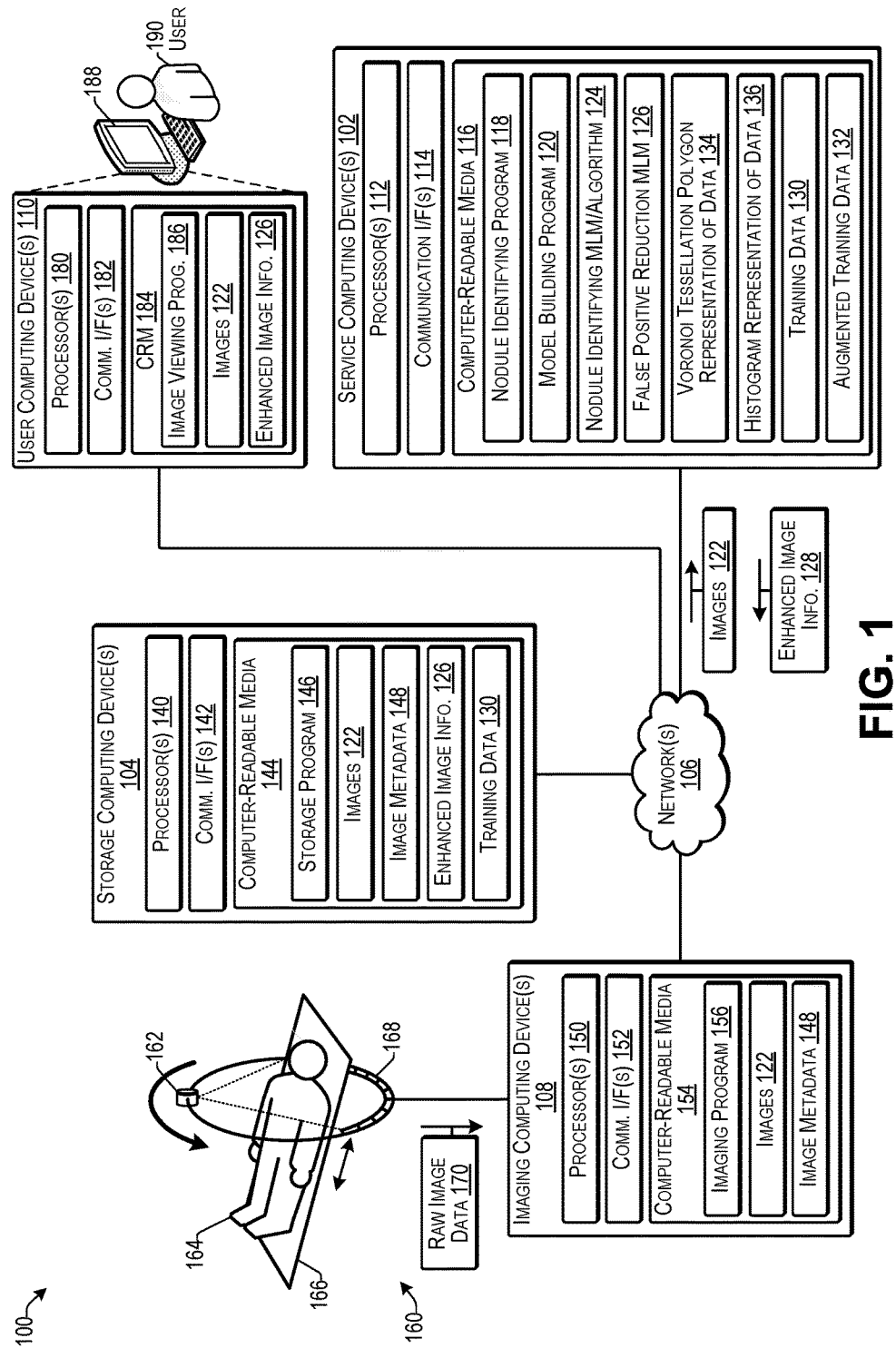
FIG. 1 illustrates an example architecture of a system able to perform image processing according to some implementations.

Some implementations herein are directed to techniques and arrangements for reducing false positive identification of nodules during automated nodule detection in images. Some examples include false positive reduction in computer-assisted detection of lung nodules by integrating undersampling techniques, data augmentation techniques, and feature extraction techniques with a trained machine learning model (MLM). The resulting system and MLM not only reduce the false positive rate, but also provide robust performance for identifying locations of lung nodules and providing a visualization to indicate a location of an identified nodule. Accordingly, implementations herein may provide clinical assistance to radiologists or other medical practitioners for identifying locations of nodules with greater accuracy and shorter reading time.

Some examples herein apply informed undersampling and data augmentation techniques to preprocess a class-imbalanced dataset for generating data sets of image samples that are better balanced during building and training of the MLM. Image features of interest may be identified and extracted from the balanced image samples as image patches, such as from representative locations in the images. These image features are further used to generate the trained false positive reduction MLM that classifies an associated image patch as positive or negative, which may be corresponded to true or false nodule locations, respectively. The false positive reduction MLM may be further tuned and optimized before being applied to actual use for assisting medical practitioners in identifying lung nodule locations in patient images.

Following training of the false positive reduction MLM, the false positive reduction MLM may be employed in an image processing algorithm and process for nodule detection. As one example, the image processing algorithm herein for nodule detection may include a series of steps, which may include pre-processing of the input images, initial nodule detection, false positive reduction, and generating a visualization for identified nodules, such as with a two-dimensional (2-D) or three-dimensional (3-D) rendering of an indication of a nodule location. Improvement in the speed and accuracy of the overall nodule detection algorithm may be the result of improvement in the false positive reduction step and/or others of the above steps.

Implementations herein generate and apply a false positive reduction MLM that is more effective and more accurate than conventional techniques, and that improves false positive reduction during automatic nodule detection when processing a plurality of images, such as CT images. The false positive reduction techniques herein improve the performance of the overall nodule detection system by integrating informed sampling, data augmentation, and feature extraction into the false positive reduction MLM for improving the accuracy of the false positive reduction step and reducing the computation time required for using the false positive reduction MLM.

In some examples, the false positive reduction MLM may be a gradient boosting model or similar type of classifier model. During creation and training of the false positive reduction MLM, a model building program may receive a set of training data that may include a plurality of CT images. The training data may have nodule locations already identified in the images and may include associated annotations. The model building program may preprocess the training data by performing coordinate transforms and extracting image patches from the plurality of CT images. The model building program may further perform informed sampling on the majority-class (negative) image patches using Voronoi tessellation to ensure a good distribution of negative samples that preserves sparse samples. In addition, the model building program may perform data augmentation on the minority-class (positive) image patches to generate additional positive samples for increasing the minority class.

The model building program may use the informed sampling and data augmentation techniques herein to generate a plurality of datasets from the received image to use for training, validation and testing of the false positive reduction MLM. Further, the model building program may perform feature extraction from the positive and negative samples and may perform parameter tuning and cross validation until the predefined metrics converge. Following completion of generation of the false positive reduction MLM, a nodule identifying program may apply the trained false positive reduction MLM to generate output labels for one or more images. Based on the positive output labels, the nodule identifying program may generate associated visualizations and/or metadata for the respective patient images, such as for highlighting or otherwise visually distinguishing an identified nodule in the one or more images.

For discussion purposes, some example implementations are described in the environment of a computing device that generates a trained machine learning model for processing CT images during automated identification of locations of lung nodules. However, implementations herein are not limited to the specific examples provided, but may be extended to other types of images and imaging techniques, other types of environments, other system architectures, other types of nodules and cancers, and so forth, as will be apparent to those of skill in the art in light of the disclosure herein. As several examples, the techniques herein may be used to identify nodules in or on other body parts such as brain, thyroid, breast, liver, lymph nodes, stomach, throat, intestines, prostate, pancreas, kidney, and so forth. Thus, implementations herein are not limited to any particular type of cancer, body part, or the like. Further, the techniques herein may be applied to various other types of images and imaging systems in addition to CT images, such as MRI images, ultrasound images, and so forth.

FIG. 1 illustrates an example architecture of a system 100 able to perform image processing according to some implementations. The system 100 includes at least one service computing device 102 that is able to communicate with at least one storage computing device 104, such as through one or more networks 106. In addition, the storage computing device(s) 104 and/or the service computing device(s) 102 may communicate over the one or more networks 106 with one or more imaging computing devices 108 and one or more user computing devices 110.

In some examples, the service computing device(s) 102, storage computing device(s) 104, imaging computing device(s) 108, and/or user computing devices 110 may include one or more servers, personal computers, or other types of computing devices that may be embodied in any number of ways. For instance, in the case of a server, the programs, other functional components, and at least a portion of data storage may be implemented on at least one server, such as in a cluster of servers, a server farm or data center, a cloud-hosted computing service, and so forth, although other computer architectures may additionally or alternatively be used.

In the illustrated example, the service computing device 102 includes, or may have associated therewith, one or more processors 112, one or more communication interfaces (I/Fs) 114, and one or more computer-readable media 116. Each processor 112 may be a single processing unit or a number of processing units, and may include single or multiple computing units, or multiple processing cores. The processor(s) 112 can be implemented as one or more central processing units, microprocessors, microcomputers, microcontrollers, digital signal processors, state machines, logic circuitries, graphics processing units, and/or any devices that manipulate signals based on operational instructions. For instance, the processor(s) 112 may be one or more hardware processors and/or logic circuits of any suitable type specifically programmed or configured to execute the algorithms and processes described herein. The processor(s) 112 may be configured to fetch and execute computer-readable instructions stored in the computer-readable media 116, which can program the processor(s) 112 to perform the functions described herein.

The computer-readable media 116 may include volatile and nonvolatile memory and/or removable and non-removable media implemented in any type of technology for storage of information such as computer-readable instructions, data structures, program modules, or other data. For example, the computer-readable media 116 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the service computing device 102, the computer-readable media 116 may be a tangible non-transitory medium to the extent that, when mentioned, non-transitory computer-readable media exclude media such as energy, carrier signals, electromagnetic waves, and/or signals per se. In some cases, the computer-readable media 116 may be at the same location as the service computing device 102, while in other examples, the computer-readable media 116 may be partially remote from the service computing device 102.

The computer-readable media 116 may be used to store any number of functional components that are executable by the processor(s) 112. In many implementations, these functional components comprise instructions or programs that are executable by the processor(s) 112 and that, when executed, specifically program the processor(s) 112 to perform the actions attributed herein to the service computing device 102. Functional components stored in the computer-readable media 116 may include a nodule identifying program 118 and a model building program 120.

The nodule identifying program 118 may include one or more computer programs, computer-readable instructions, executable code, or portions thereof that are executable to cause the processor(s) 112 to receive a plurality of images 122, use a nodule identifying machine learning model (MLM) 124 to make a preliminary identification of the locations of any nodules that may be present in the plurality of images 122, and use a false positive reduction MLM 126, as disclosed herein, to reduce or otherwise remove false positive nodule identifications from the output of the nodule identifying MLM 124. The nodule identifying program 118 may generate or otherwise output enhanced image information 128, which may include annotated, highlighted or otherwise modified images, image metadata, or the like, based on the identification of one or more nodules in the images 122. As one example, the nodule identifying program 118 may provide information indicating one or more bounding boxes to specify a location of an identified nodule in one or more of the images 122, and may include this information with the enhanced image information 128 sent to at least one of the storage computing device 104 or the user computing device 110.

The model building program 120 may include one or more computer programs, computer-readable instructions, executable code, or portions thereof that are executable to cause the processor(s) 112 to generate the false positive reduction MLM 126. The false positive reduction MLM 126 may be trained using training data 130 that may be obtained from the storage computing device(s) 104 or other network location. For example, the training data 130 may be obtained from a database of images that have been manually examined by radiologists for locating and identifying nodules that may be present in the training data images.

As one example, the false positive reduction MLM 126 may be a gradient boost model or similar classifier model. Gradient boosting is a machine learning technique for regression and classification problems. A gradient boost model may be a prediction model that includes an ensemble of weak prediction models such as a plurality of decision trees. The model building program 120 may build the weak prediction models in a stage-wise fashion and may generalize the weak prediction models by allowing optimization of an arbitrary differentiable loss function. Additional details of generating the false positive reduction MLM 126 are discussed below.

In some cases, the nodule identifying MLM 124 may be generated separately from the false positive reduction MLM 126 using known image analysis and recognition techniques. As one example, the nodule identifying MLM 124 may perform image processing for nodule detection by determining gradients in the respective images, performing high order feature determination based on the gradients, and filtering the results to preliminarily determine the locations of any suspected nodules.

Additional functional components in the computer-readable media 116 of the service computing device(s) 102 may include an operating system (not shown in FIG. 1) that may control and manage various functions of the service computing device 102. In some cases, the functional components may be stored in a storage portion of the computer-readable media 116, loaded into a local memory portion of the computer-readable media 116, and executed by the one or more processors 112. Numerous other software and/or hardware configurations will be apparent to those of skill in the art having the benefit of the disclosure herein.

In addition, the computer-readable media 116 may store data and data structures used for performing the functions and services described herein. For example, the computer-readable media 116 may store the training data 130 and, as discussed additionally below, data generated during creation of the false positive reduction MLM 126, such as augmented training data 132, a Voronoi tessellation polygon representation of data 134, and a histogram representation of data 136.

The service computing device 102 may also include or maintain other functional components and data, which may include programs, drivers, etc., and other data used or generated by the functional components. Further, the service computing device 102 may include many other logical, programmatic, and physical components, of which those described above are merely examples that are related to the discussion herein.

Additionally, in some examples, a portion of the operations described herein may be performed by a first one of the service computing devices 102, and another portion of the operations may be performed by a second one of the service computing devices 102. As one example, one or more first service computing devices 102 may execute the model building program 120 for building and training the false positive reduction MLM 126, while one or more second service computing devices 102 may execute the nodule identifying program 118 to apply nodule identifying MLM 124 and the false positive reduction MLM 126 for analyzing the images 122. Numerous other variations will be apparent to those of skill in the art having the benefit of the disclosure herein.

The communication interface(s) 114 may include one or more interfaces and hardware components for enabling communication with various other devices, such as over the one or more networks 106. Thus, the communication interfaces 114 may include, or may couple to, one or more ports that provide connection to the network(s) 106 for communicating with the storage computing device(s) 104, the imaging computing device(s) 108, and/or the user computing device(s) 110. For example, the communication interface(s) 114 may enable communication through one or more of a LAN (local area network), WAN (wide area network), the Internet, cable networks, cellular networks, wireless networks (e.g., Wi-Fi) and wired networks (e.g., fiber optic, Ethernet, Fibre Channel,), direct connections, as well as close-range communications, such as BLUETOOTH®, and the like, as additionally enumerated below.

The one or more networks 106 may include any type of network, including a LAN, such as an intranet; a WAN, such as the Internet; a wireless network, such as a cellular network; a local wireless network, such as Wi-Fi; short-range wireless communications, such as BLUETOOTH®; a wired network including fiber optics, Ethernet, Fibre Channel, or any other such network, a direct wired connection, or any combination thereof. Accordingly, the one or more networks 106 may include both wired and/or wireless communication technologies. Components used for such communications can depend at least in part upon the type of network, the environment selected, or both. Protocols for communicating over such networks are well known and will not be discussed herein in detail. Accordingly, the service computing device(s) 102, the storage computing device(s) 104, the imaging computing device(s) 108, and the user computing device(s) 110 are able to communicate over the one or more networks 106 using wired or wireless connections, and combinations thereof.

The storage computing device(s) 104 may include one or more processors 140, one or more communication interfaces 142, and one or more computer-readable media 144. In some examples, the storage computing device(s) 104 may have a hardware configuration similar to the service computing device(s) 102 discussed above. For example, the one or more processors 140 may include any of the examples of processors 112 discussed above, the one or more communication interfaces 142 may include any of the examples of communication interfaces 114 discussed above, and the one or more computer-readable media 144 may include any of the examples of computer-readable media 116 discussed above.

The computer-readable media 144 on the storage computing device(s) 104 may include a storage program 146 for managing storage of data stored by the storage computing devices 104. Further, the computer-readable media 144 may store images 122, image metadata 148, enhanced image information 128, which may be received from the service computing device 102, and training data 130.

In some examples, the storage computing device(s) 104 may include a number of separate storage systems, which may include hospital databases and storage systems, imaging specialists databases and storage systems, research and/or university databases and storage systems, or the like, which may include network-based storage systems, storage area networks, object storage systems, cloud storage systems, or the like. Furthermore, as one example, the training data 130 may be obtained from publicly available datasets from the Lung Nodule Analysis 2016 (LUNA'16) Competition. For instance, the training datasets may originate from the Lung Image Database Consortium image collection, and may be normalized to exclude scans with a through-plane resolution of greater than 2.5 mm. Annotations from a two-phase annotation process using four experienced radiologists are also included in the in LUNA'16 data to enable generation of associated positive or negative image patches. In some examples herein, the reference standard of the annotation may include all nodules ≥3 mm accepted by at least three out of four radiologists. The complete LUNA'16 dataset contains 888 sets of 3D CT scans and may be divided into 10 subsets that may be used for training, cross-validation, and/or testing purposes. Other training data 130 may be used in addition to or as alternative to the LUNA'16 data sets. Furthermore, while the example of FIG. 1 illustrates the images 122, image metadata 148, and the training data 130 being maintained in a separate storage system accessible over the networks 106, in other examples, any of this data may be maintained locally by the one or more service computing devices 102.

The imaging computing device(s) 108 may include one or more processors 150, one or more communication interfaces 152, and one or more computer-readable media 154. In some examples, the imaging computing device(s) 108 may have a hardware configuration similar to the service computing device(s) 102 discussed above. For example, the one or more processors 150 may include any of the examples of processors 112 discussed above, the one or more communication interfaces 152 may include any of the examples of communication interfaces 114 discussed above, and the one or more computer-readable media 154 may include any of the examples of computer-readable media 116 discussed above. The computer-readable media 154 may include an imaging program 156, the images 122, and the image metadata 148.

The imaging computing device 108 may be integrated with or otherwise associated with an imaging system 160. In the illustrated example, the imaging system is a CT scanning system, but in other examples, the imaging system 160 may be an MRI system, an ultrasound imaging system, or other type of imaging system. In this example, an x-ray source 162 is rotated about a patient 164 who may be on axially-movable platform 166, or alternatively, the x-ray source 162 may also be movable axially along the patient's body. Detectors 168 receive the x-rays and provide raw image data 170 to the imaging computing device(s) 108. The imaging program 156 may process and store the raw image data 170 as one or more of the images 122 in association with the image metadata 148. The image metadata 148 may include patient information, date, time, image focus, body location, and so forth.

The user computing device(s) 110 may include one or more processors 180, one or more communication interfaces 182, and one or more computer-readable media 184. In some examples, the user computing device(s) 110 may have a hardware configuration similar to the service computing device(s) 102 discussed above and/or may include other types of computing devices, such as tablet computing devices, mobile computing devices, smart phones, virtual reality devices, augmented reality devices, and so forth. Further, the one or more processors 180 may include any of the examples of processors 112 discussed above, the one or more communication interfaces 182 may include any of the examples of communication interfaces 114 discussed above, and the one or more computer-readable media 184 may include any of the examples of computer-readable media 116 discussed above. In some examples, the computer-readable media 184 may include an image viewing program 186, the images 122, and the enhanced image information 128. In some examples, the user computing device 110 may include a display 188, upon which the image viewing program 186 may present one or more of the images 122 and the enhanced image information 128.

As one example, a user 190, such as a radiologist or other medical professional may access the images 122 and image metadata 148 to view the images for a particular patient. For instance, the image viewing program 186 may include a browser, or may run on a browser, for remotely accessing and viewing the images 122, such as through communication over the one or more networks 106 with the nodule identifying program 120. In the browser-based example, the image viewing program 186 may access the nodule identifying program 118 over the one or more networks and identify the patient/images of interest, which may cause the nodule identifying program 118 to retrieve the corresponding images 122 from the storage computing device 104. The nodule identifying program 118 may send the images 122 to the user computing device 110 for viewing via the browser executing as the image viewing program 186. For instance, the user 190 may select one or more of the images or an area in one or more of the images to query as to whether the image contains any nodules. In response, as discussed below with respect to FIG. 2, the nodule identifying program 118 may perform the nodule identifying process of FIG. 2 in real time, and may return the enhanced image information 128 that is presented by the image viewing program 186 to identify the location of any detected nodules in the selected images 122. For example, the enhanced image information 128 may include location information and other annotation information that causes the image viewing program to present an enhanced image, such as 2-D or 3-D image that highlights or otherwise visually distinguishes the location of a detected nodule on the display 188.

Alternatively, as another example, the image viewing program 186 may be a dedicated image viewer application that pulls the images 120 from the storage computing device 104 or from the service computing device 102. The enhanced image information 128 may be received and used by the image viewing program 186 to highlight or otherwise identify one or more areas in the images 122 at which a nodule has been identified by the nodule identifying program 118. In some cases, the enhanced image information 128 may be generated in real time, e.g., the user 190 may click on, or otherwise select an image or set of images 122, which causes the image viewing program 186 to send a communication to invoke the nodule identifying program 118 to access and perform nodule detection on the specified image(s) 122. As another alternative, the nodule identifying program 118 may have been invoked in advance, and the enhanced image data 128 may be generated and stored in association with the image metadata 148 and the images 122, such as by the storage computing device 104, or by the user computing device 110. As still another alternative, the nodule identifying program 118, the nodule identifying MLM 124, and the false positive reduction MLM 126 may be located at and/or executed on the user computer device 110. Further, while several example use cases and software configurations are discussed herein, numerous other variations will be apparent to those of skill in the art having the benefit of the disclosure herein.

In the example of FIG. 1, the model building program 120 may be executed to generate a trained false positive reduction MLM 126 that enables the service computing device 102 to perform nodule identification more efficiently by reducing false positives during nodule identification in manner that is more accurate and that requires less computation time than conventional techniques. For example, because the false positive reduction MLM 126 herein is more accurate than conventional models, the service computing device 102 executes more efficiently during the nodule identification stage and does not require the use of additional steps for reducing false positive identifications of nodules in the images. Accordingly, the false positive reduction MLM provides an improved software arrangement that improves the overall nodule detection system.

When generating the false positive reduction MLM 126, some examples herein formulate the false positive reduction task as a binary classification problem, and solve this problem through an extreme gradient boosting (XGBoost) model or other suitable model. As one example, consider a set Y as a set of binary labels, and $T=\{(z_i, y_i)\}_{i=1}^m$ as a training dataset, where $z_i \in R^d$ is a vector representing the features from the $i^{th}$ image patch of a plurality of image patches from 1 to m, $R^d$ is the d-dimensional real space based on the number of pixels in the image patches, and $y_i$ indicates the label associated with the image patch $z_i$, e.g., received from the nodule identifying MLM 124.

The XGBoost model may be configured to output a decision $\delta(z_i) \in Y$ from a set of base classifiers $\{\delta_r\}_{r \in R}$, where R is a class of parameterized classification models, such as decision trees or other classification models. As one example, the XGBoost model may employ a set of parameterized trees as the base classifiers, where $$\delta(z_i) = \sum_{r=1}^{R} \alpha_r \delta_r(z_i, \beta_r),$$

wherein $\alpha$ and $\beta$ are configurable parameters for each of the tree classifiers $\delta$, and which may be adjusted for applying a weighting to the decision tree outcome. Further, while decision trees are an example of a base classifier herein, other types of base classifiers may also, or alternatively, be used.

In some examples, the model training technique herein may be made similar to minimizing the empirical loss, $$\{\hat{\alpha}, \hat{\beta}\} = \mathrm{argmin}_{\{\hat{\alpha}, \hat{\beta}\}} \sum_{i=1}^{m} \mathcal{L}(y_i, \delta(z_i)) + \lambda \mathcal{R}(\delta(z_i)),$$

where $\mathcal{L}(\cdot)$ is a customizable empirical loss function, $\lambda$ is a regularization parameter and $\mathcal{R}(\cdot)$ is a regularization function. Accordingly, the above problem may be convex and may be solved by a variety of convex optimization algorithms. As one example herein, the above optimization problem may be solved using a forward stage-wise regression routine, which is available from the XGBoost 0.6.0 package for the PYTHON® Programming Language.

The training data 130 may be used during both training and testing of the machine learning model 126. As mentioned above, in some examples, the training data 130 may include publicly available datasets from the LUNA'16 competition, although implementations herein are not limited to any particular training data 130.

In addition, during hyperparameter tuning, grid search and manual search are perhaps the most prevalent conventional approaches. However, one potential problem of applying grid search or manual search is the heavy computational overhead that may result from a large number of parameters in the XGBoost model. Accordingly, as discussed additionally below, some implementations herein balance accuracy and computation time by tuning hyperparameters using a randomized search technique. The randomized search technique herein may provide results comparable to, or superior to, results of other conventional techniques, while using a substantially shorter computation time. For instance, by using randomized search for tuning the model parameters, the model building program is able to traverse a larger search space within the same amount of time. Thus, examples herein may apply a randomized search strategy for an optimized set of parameters in a 10-fold cross validation procedure, such as through use of a routine available from the Scikit-Learn 0.18.0 package for the PYTHON® Programming Language.

FIGS. 2, 3, 9, and 14 include flow diagrams illustrating example processes according to some implementations. The processes are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures, and the like, that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, frameworks, and systems described in the examples herein, although the processes may be implemented in a wide variety of other environments, frameworks, and systems.

Figure 2:
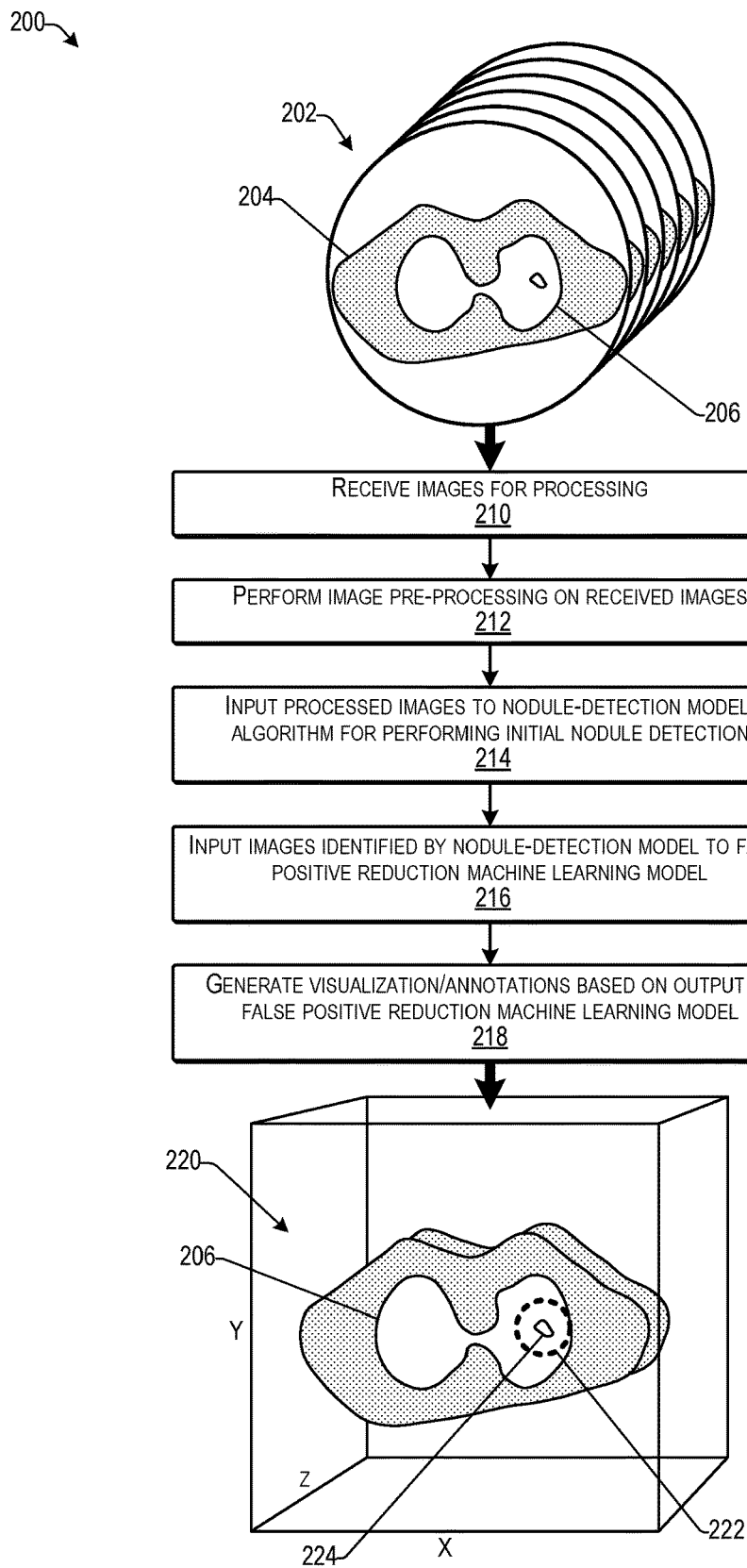
FIG. 2 illustrates an example process for nodule detection according to some implementations.

FIG. 2 is a flow diagram illustrating an example process 200 for identifying nodules in images with false positive reduction according to some implementations. In some examples, the process 200 may be executed by the service computing device(s) 102 or other suitable computing device(s). The process 200 sets forth an example algorithm for automatic nodule detection from CT images, or the like, according to some implementations. For instance, a plurality of images 202 may each include an image of a patient body part, such as a cross-section 204 of the patient's lungs 206 in this example. A series of operations may be performed by the computing device for identifying any nodules in the images 202.

At 210, the computing device may receive the images 202. For example, as discussed above with respect to FIG. 1, a user, such as a radiologist or other medical professional may use the image viewing program to invoke the nodule identifying program to access a set of CT images for a patient for identifying any nodule locations in the images. In some cases, the user may make a preliminary selection or other indication of a possible nodule location in the images, while in other cases, the user may merely specify a set of images for processing.

At 212, the computing device may preprocess the images, such as by reducing the larger images to image patches of a specified pixel width and height, normalizing contrast, reducing noise, and so forth. For example, the image patches may be the portions of the images likely to contain nodules. For instance, in the case that the images are of a patient's lungs, the image patches may be taken from the portions of the image that include the lungs, and not from other portions of the images.

At 214, the computing device may input the images to the nodule identification MLM that preliminarily identifies any locations in the images that are likely to contain nodules. As one example, the nodule identification MLM may include image preprocessing and may perform edge detection, such as by determining gradients in the images, performing high order feature determination based on the gradients, and filtering the results to preliminarily determine the locations of any suspected nodules. As one example, an output of the nodule identification MLM may include a bounding box indicating a location of preliminarily identified nodule according to the nodule identification MLM.

At 216, the computing device may employ the false positive reduction MLM described herein to determine which of the locations preliminarily identified in the images at 214 are likely to actually contain nodules. For example, the computing device may input one or more images indicated to have a nodule location identified to the false positive reduction MLM, along with corresponding location information received from the nodule identification MLM, to determine whether the indication of the nodule is accurate or otherwise correct. In some examples, the false positive reduction MLM may provide a binary output, either positive, i.e., there is a nodule at the location, or negative, i.e., there is not a nodule at the location. Additional details of the false positive reduction MLM are described below.

At 218, the computing device may generate visualization information for presentation to the user based on the output at 216. For example, as illustrated in FIG. 2 at 220, the visualization may be a 2-D or 3-D image of the portion of the patient's body, e.g., the patient's lung 206 in this example, having a highlighted or otherwise visually distinguishing feature 222 for indicating to the user the location of a detected nodule 224. For instance, a 3-D image may be constructed from the plurality of cross-section images 202 and presented in an xyz space in which the image may be manipulable to view from different angles, perspectives, zoom levels, and so forth.

As discussed additionally below, the false positive reduction MLM herein may improve the accuracy of the false positive reduction, while also reducing computing time and enabling the nodule identifying program to perform computing more efficiently. Accordingly, the false positive reduction MLM provides an improvement in computer function of the service computing device itself by improving the way that the service computing device processes images for reducing false positive nodule identifications and subsequently generating a visualization of positive nodule identification locations based on the output of the false positive reduction MLM.

Figure 3:
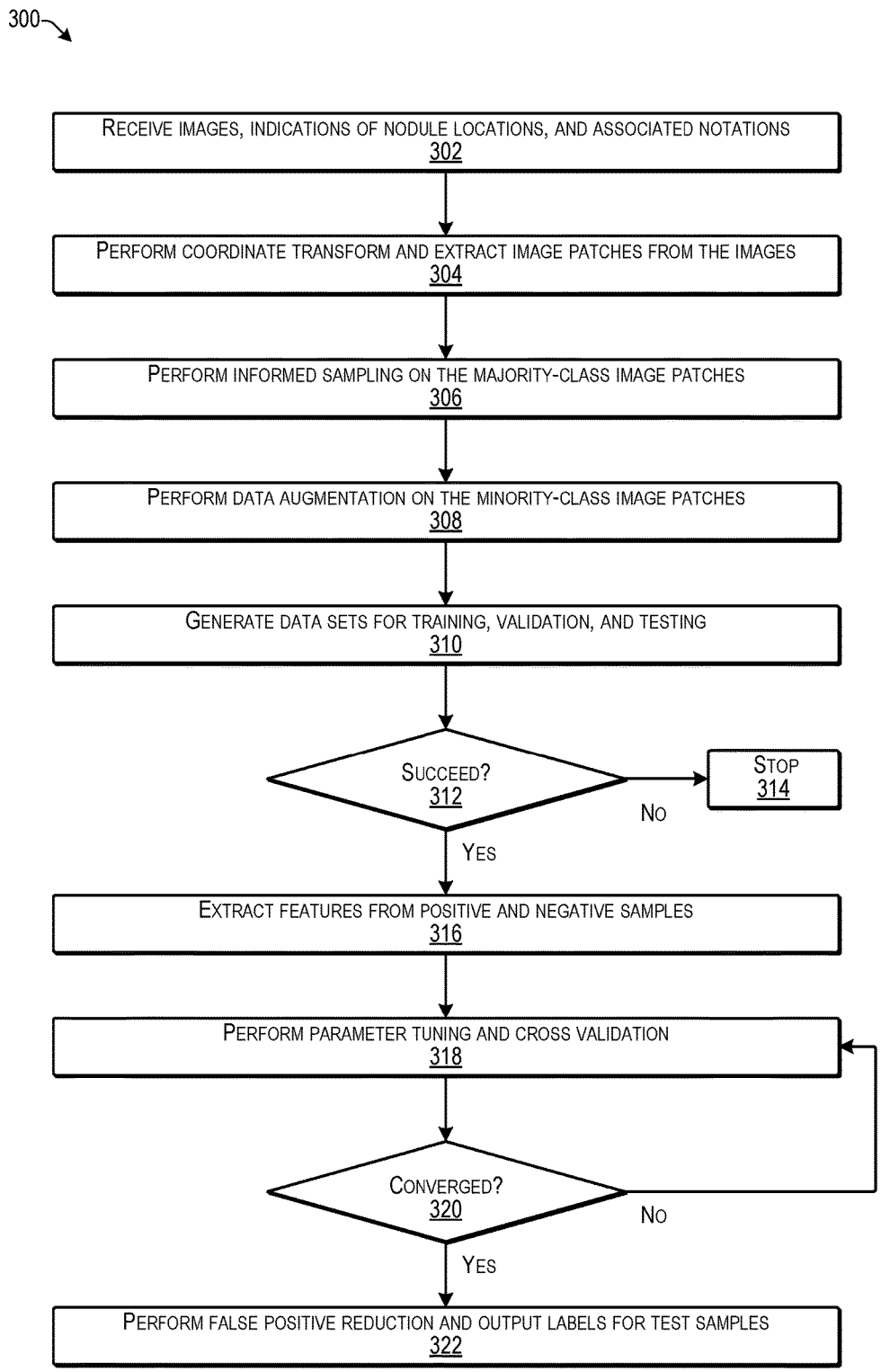
FIG. 3 is a flow diagram illustrating an example process for generating a machine learning model for false positive reduction according to some implementations.

FIG. 3 is a flow diagram illustrating an example process 300 for generating the false positive reduction MLM according to some implementations. In some examples, the process 300 may be executed by the service computing device(s) 102 or other suitable computing device(s), such as by executing the model building program for generating a machine learning model able to perform false positive reduction during automatic nodule detection from CT images or the like.

At 302, the computing device may receive images, indicated nodule locations, and associated annotations. For instance, as training data, the computing device may access or otherwise receive a plurality of CT images of interest, some of which may include indicated nodule locations and associated annotations, such as may have been made by radiologists, or the like. As mentioned above, as one example, the training data may be obtained from the LUNA'16 Competition or other suitable sources, and may be normalized to exclude scans with a through-plane resolution of greater than 2.5 mm. Annotations from a two-phase annotation process using four experienced radiologists are also included in the in LUNA'16 data, and may be used to generate associated positive and negative image patches.

At 304, the computing device may perform preprocessing on the received images. For example, the computing device may perform coordinate transforms and may extract image patches from the images. In some cases, the image patches determined from the received images may be of a uniform pixel height and width, and may be obtained from the portions of the images that are likely to contain nodules. For instance, in the case of lung nodule detection, the image patches may include at least a portion of a lung, rather than other body parts or areas outside the patient's lungs.

At 306, the computing device may perform informed sampling on the majority-class (negative) image patches. In some examples herein, the computing device may perform informed sampling on the majority-class (negative) image patches using Voronoi tessellation, as discussed below. The informed sampling herein enables selection (sampling) of a distribution of a variety of different images to create one or more data sets that can be used for training the model, while leaving a sufficient amount of different data to create one or more additional data sets for validating or testing the model. For example, it is undesirable to use the same data to both train the model and test the model. Accordingly, the majority class of the received training data may be sampled (i.e., a plurality of images selected therefrom) for creating a plurality of data sets, each including different images. For instance, one or more of the data sets may be used to train the model and one or more of the data sets may be used for validation and testing of the model. As mentioned above, as one example, ten different data sets may be created from the received training data. As cross validation, the false positive reduction MLM may be alternately trained and tested using different combinations of the ten different data sets.

Conventional techniques may include randomly dividing the training data into multiple data sets or using clustering techniques to divide the data into data sets. However, these techniques may not provide as accurate a model as the techniques herein of performing informed sampling for determining data sets that include a variation in image content and preserve sparse samples. Accordingly, the informed sampling herein uses Voronoi tessellation to detect similarities and differences in the image patches to determine a frequency of different image types, and to enable selection of samples for a plurality of data sets based on consideration of the frequency, as discussed additionally below, e.g., with respect to FIGS. 5-7.

At 308, the computing device may perform data augmentation on the minority-class (positive) image patches. For example, as discussed additionally below, the computing device may create augmented data on the minority-class (positive) image patches by generating additional image patches of different appearance by translating, zooming, rotating, flipping, and/or otherwise altering the minority (positive) image patches. Thus, the number, variance, and cardinality of the positive samples can be increased to enable the data sets to have a larger number of positive samples that differ in appearance from other positive samples.

At 310, the computing device may generate a plurality of data sets for training, validation, and testing. For example, the computing device may use the informed sampling and data augmentation discussed above to generate multiple data sets from the received training data and the augmented training data. As one example, a plurality of data sets may be created and one data set may be used for the training phase, while others of the data sets may be used for the validation/testing phase, and then a next one of the data sets may be used for the training phase, while others of the data sets may be used for the validation/testing phase, and so forth. During the training phase, the training data set is used to determine parameters for the model by pairing the input with expected output. During the validation/testing phase one or more different data sets may be used to determine how well the model has been trained and to determine model properties (e.g., whether the model produces any classification errors).

At 312, the computing device may determine whether the generation of the training data sets is successful. For example, if a training data set does not produce a model that generates a correct output when the testing data sets are applied to the model, then the data sets may be imbalanced and/or may require additional investigation by an administrator or other user.

At 314, if the generation of the training data sets is unsuccessful, the computing device may cease generation of the model. In some examples, an administrator or other user may be notified that the training data sets were not generated successfully.

At 316, if the generation of the training data sets is successful, the computing device may extract features from positive and negative samples. As discussed additionally below, the computing device performs feature extraction from positive and negative samples. In some examples herein, as discussed additionally below, at least one extracted feature is based on determining a subspace angle between elliptical approximations of nodules for selected images and an elliptical approximation space determined for the positive images. Further, other features may also be used in some examples herein, as discussed additionally below, e.g., with respect to FIGS. 13 and 14.

At 318, the computing device may perform parameter tuning and cross validation. For example, the parameters may be tuned and cross validation may be performed until the predefined metrics converge. Non-limiting examples of parameters herein may include $\alpha$ and $\beta$ as discussed above with respect to the base decision tree classifiers, which weight the respective outputs of the plurality of respective base classifiers. Cross validation may include using additional data sets for testing the model outputs.

At 320, the computing device may determine whether the model converges. For example, a model is considered to converge if the amount of error does not increase after additional iterations. In other words, if the model produces a consistent output when tested using a large number of samples and additional training would not result in any significant change in the parameters, then the model is considered to converge. For example, if the model produces an incorrect output for some samples and a correct output for other samples, the process returns to block 318 to perform further parameter tuning until the model performs consistently.

At 322, the computing device may perform false positive reduction and output labels for test samples. For example, the model may be tested using additional test data sets to ensure the performance of the model. Following testing, the model may be deployed for performing nodule detection on patient images for users, such as radiologists or other medical professionals, e.g., as discussed above with respect to FIGS. 1 and 2.

In addition, as discussed above at 306, during generation of the false positive reduction MLM, implementations herein may perform informed sampling on the majority-class (negative) image patches. For instance, computational complexity may be a problem in the classification of nodules simply because a large number of image patches may be processed together. For example, a set of raw thoracic CT images from the National Lung Screening Trial (NLST) database may be divided into approximately 12,000 image patches of negative samples (referred to as the majority class herein) and approximately 100 image patches of positive samples (referred to as the minority class herein). Furthermore, the number of image patches may be increased substantially when data augmentation is applied on a much larger set of raw CT images. Consequently, the ensuing machine learning model may be exposed to image data of high dimensionalities, which may take a long computation time and a large amount of memory to properly handle.

A prior-knowledge-driven sampling strategy is applied in some examples herein to reduce the dimensionality for training the machine learning model herein. For instance, the sampling strategy may be "smart" enough to take into consideration the underlying distribution (i.e., have prior knowledge) of the samples. Thus, during the informed sampling herein, sparse sampling may be performed on dense clusters of samples, and dense sampling may be performed on samples that are less represented to generate the data sets used for training and testing the model. Conventionally, prior knowledge of the data samples may be obtained through clustering techniques. While there have been wide applications of clustering-method-based sampling, the resulting methods often suffer from subjectively-defined distance metrics, which may overlook less-represented, but important samples. Accordingly, implementations herein preserve the underlying sample distribution by using a true prior-knowledge-driven sampling strategy. Accordingly, when generating the data sets herein, the model building program herein may perform informed sampling that preserves important but less represented data samples. Mathematically, the informed sampling may be described as follows:

For an image I, a nonempty set $S=\{(x_i, y_i)\}_{i=1}^{m}$ can be defined such that $x_i \in R^{n \times n}$ is an image patch sampled from the $i^{th}$ candidate position from I with width n and height n, $y_i \in Y=\{1, -1\}$ is a binary class label corresponding to an instance of $x_i$, and m is the cardinality of S. Further, assume that $S=\{S_{min}|S_{maj}\}$ forms a partition where $S_{min}$ contains minority-class (positive) samples, $S_{maj}$ contains majority-class (negative) samples, and $|S_{min}| \ll |S_{maj}|$. The informed sampling herein intends to balance the cardinalities of $S_{min}$, $S_{maj}$, which may be expressed as:

$$|\Omega\{S_{maj}\}|=|S_{min}|$$

where $\Omega\{\bullet\}$ denotes an undersampling operator based on the prior knowledge on the distributions of $S_{min}$ and $S_{maj}$. In general, it may be difficult to define an appropriate $\Omega\{\bullet\}$ that satisfies the above conditions since an arbitrary undersampling strategy may significantly modify the underlying distribution of $S_{maj}$.

To address the above-mentioned difficulty, the model building program herein may be configured to use Voronoi tessellation to perform an informed sampling of the training data for generating the data sets. Voronoi tessellation includes partitioning a plane (or 3D space) into regions based on distance to points in a specific subset of the plane (or space). The set of points (referred to e.g., as seeds) is specified beforehand, and for each seed there is a corresponding region consisting of all points closer to that seed than to any other. These regions may be referred to as Voronoi polygons. For a particular element $(x_k, y_k) \in S_{maj}$, for instance, the process of Voronoi tessellation may define a Voronoi polygon enclosing all adjacent elements that lie spatially closer to $(x_k, y_k)$ than to other elements of $S_{maj}$. In some cases, the Voronoi tessellation herein may be performed for every element in $S_{maj}$.

The false positive reduction MLM described herein accelerates the operation of the computing device (e.g., server, cloud platform, or other service computing device as discussed above) because the model building techniques described herein significantly improve the efficiency of model training and reduce the associated hardware requirements. As one example, because informed sampling is performed for determining the training image datasets, the model building program handles a significantly lower-dimensional dataset, which is also better balanced for representing the features of the originally received training data, e.g., such as compared to use of raw data that does not go through the informed sampling procedures herein. In addition, when the model building program herein operates on this lower-dimensional dataset, less memory and computational time and/or capacity is required for model training. For example, the training data set(s) are intrinsically lower dimensional and involve much smaller time and space complexity in terms of processing, and furthermore, a better model can be obtained because the data sets used for training are better balanced. In addition, from a practical model deployment standpoint, the false positive reduction MLM herein allows more image data to be processed using an existing computing platform (e.g., server, cloud computing platform, etc.). This the false positive reduction MLM herein reduces the hardware requirements (e.g., computational resources, transmission resources, and storage resources) utilized during processing of patient images for detecting nodules.

Figure 4:
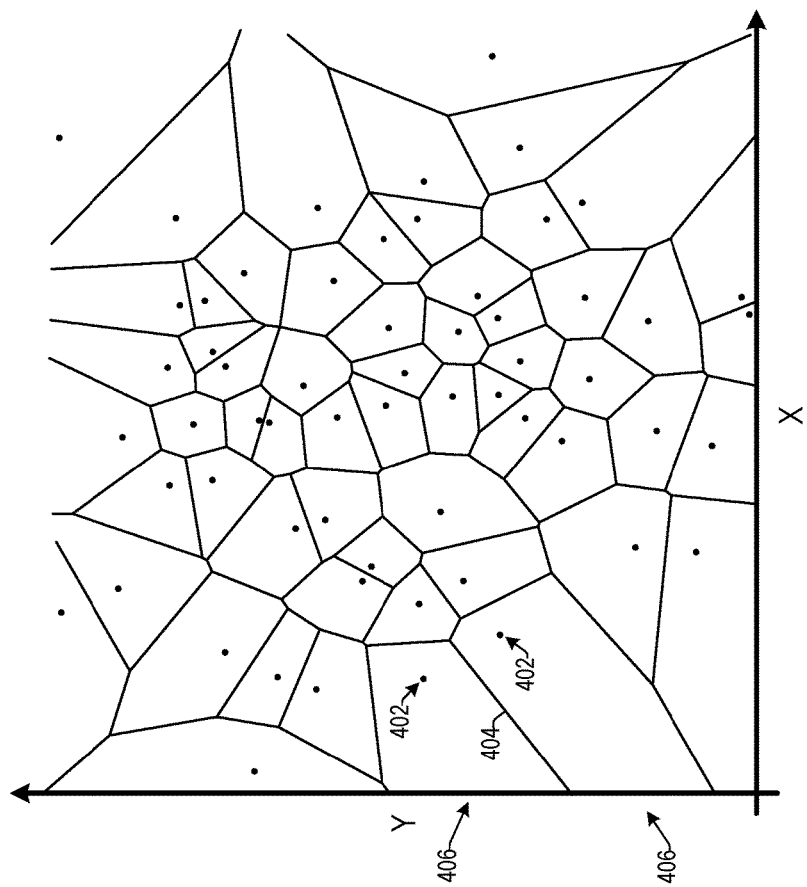
FIG. 4 illustrates an example of Voronoi tessellation polygons according to some implementations.

FIG. 4 illustrates an example mapping 400 of Voronoi tessellation polygons according to some implementations. This example illustrates the Voronoi tessellation process in a simplified two-dimensional case. Each black dot 402 may represent an element in $S_{maj}$ and each line 404 between two dots 402 may represent a boundary of the corresponding Voronoi polygon 406. In the example of FIG. 4, the volume covered by the resulting respective Voronoi polygons 406 may be used for defining $\Omega\{\bullet\}$ because the volume serves as a straightforward measure of the level of clustering for the associated element $(x_k, y_k)$, i.e., densely distributed elements are usually assigned to smaller Voronoi polygons during the tessellation process, and vice versa. Accordingly, $\Omega\{\bullet\}$ may be defined based on an undersampling frequency that is inversely proportional to the volume of the resulting Voronoi polygons.

Figure 5:
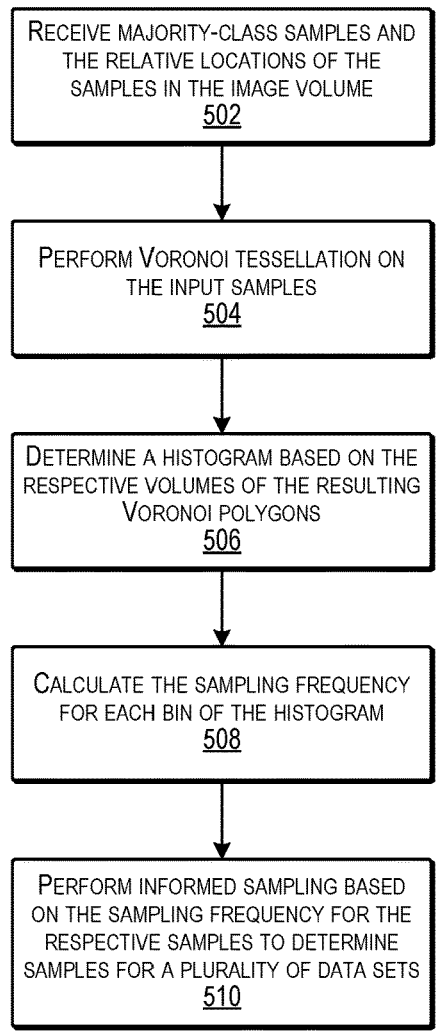
FIG. 5 is a flow diagram illustrating an example process for performing informed sampling according to some implementations.

FIG. 5 is a flow diagram illustrating an example process for performing informed sampling according to some implementations. In some examples, the process 500 may be executed by the model building program executing on the service computing device 102 or other suitable computing device.

At 502, the computing device may receive majority-class (negative) samples and the relative locations of the samples in the image volume. As mentioned above, the majority-class samples correspond to the image samples determined to not include nodules. Thus, the computing device may receive the image samples from the majority class and determine relative locations in the image volume. As one example, the location of each dot corresponds to a respective location of an image patch in the image volume, which in the example training data described above, may have been determined by the consensus of a panel of four radiologists. For each image patch, an associated location is identified as a coordinate triplet (x, y, z), where x, y, and z denotes the relative locations in space of the image patch in the associated image volume.

At 504, the computing device may perform Voronoi tessellation on the input samples. For example, the computing device may perform Voronoi tessellation on the predefined image samples from the majority (negative) class. An illustration of the input and output of this operation is discussed additionally below with respect to FIG. 6.

At 506, the computing device may determine a histogram based on the respective volumes of the Voronoi polygons in the resulting Voronoi set. For example, the histogram may include a plurality of bins corresponding to respective volume ranges, with a height of each bin representing a quantity of Voronoi polygons having volumes corresponding the respective bins.

At 508, the computing device may determine the sampling frequency for each bin of the histogram. For example, the computing device may calculate the sampling frequency based on the height of each bin of the histogram. In general, the sampling frequency may be inversely proportional to the height of non-zero bins of the histogram.

At 510, the computing device may perform informed sampling based on the determined sampling frequency to determine samples for a plurality of different data sets. As mentioned above, the sampling frequency may be inversely proportional to the height of non-zero bins of the histogram. In some examples, the sampling may be performed on bins that also have significantly higher heights in order to preserve the under-represented samples. Accordingly, by use of the Voronoi tessellation to group similar samples, and by using a sampling frequency inversely proportional to the heights of the respective bins in the histogram, geometric features of the samples are automatically taken into consideration and sparse samples are preserved.

Figure 6:
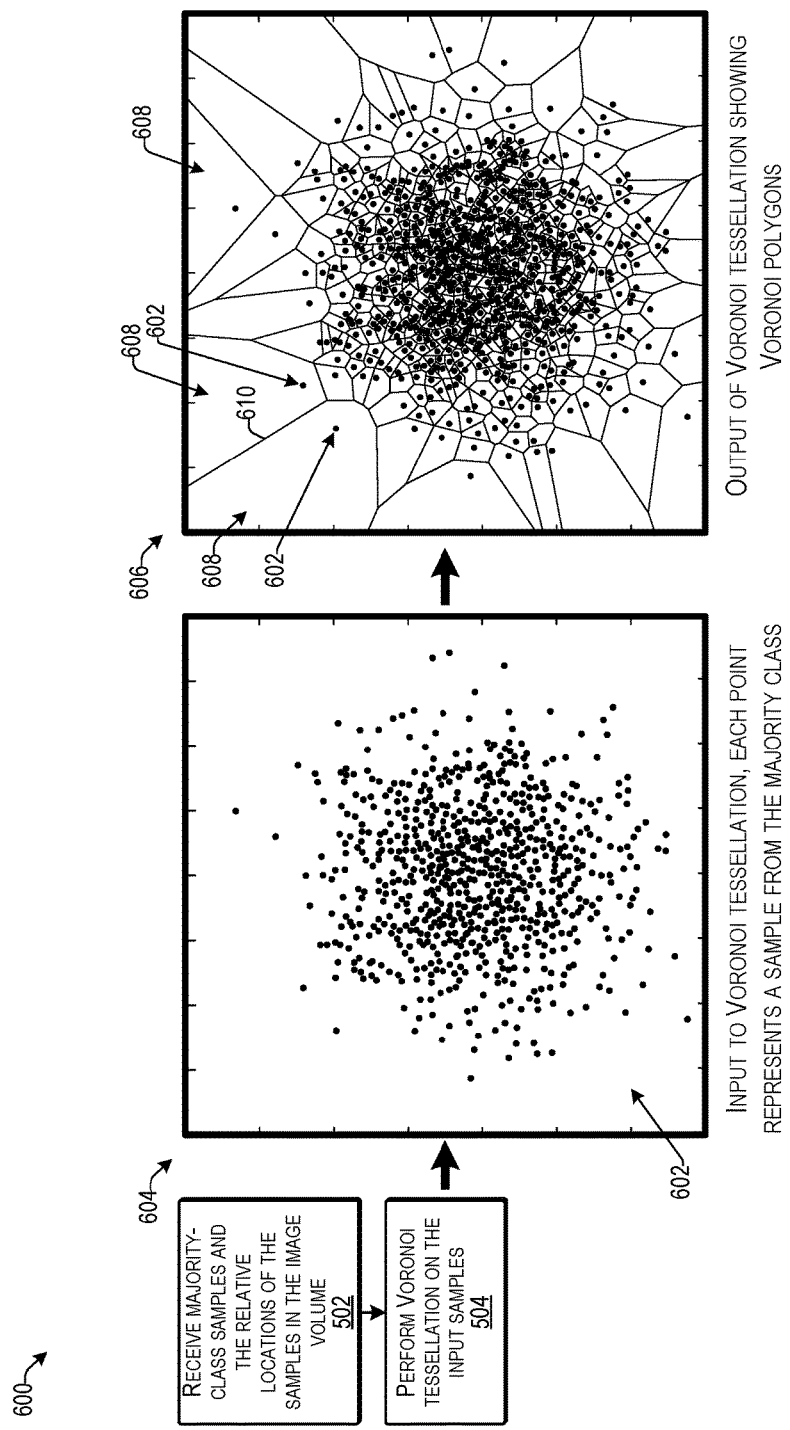
FIG. 6 illustrates an example of performing Voronoi tessellation on input samples to determine Voronoi polygons according to some implementations.

FIG. 6 illustrates an example 600 of performing Voronoi tessellation on input samples to determine Voronoi polygons according to some implementations. As mentioned above, the majority-class samples correspond to the (negative) image samples determined to not include nodules. Thus, the computing device may receive the image samples from the majority class and determine relative locations in each of the images. These locations are represented as dots 602 in a 2-D or 3-D image space 604. Accordingly, each dot 602 may represent a sample from the majority class.

As indicated at 606, the computing device may perform Voronoi tessellation on the input samples represented by the dots 602 to determine a plurality of corresponding Voronoi polygons 608. As mentioned above, each line 610 between two dots 602 may represent a boundary of the corresponding Voronoi polygons 608. The volume covered by the resulting respective Voronoi polygons 608 indicates a measure of the level of clustering for the associated element (dot 602), i.e., densely distributed elements correspond to smaller Voronoi polygons, and vice versa.

Figure 7:
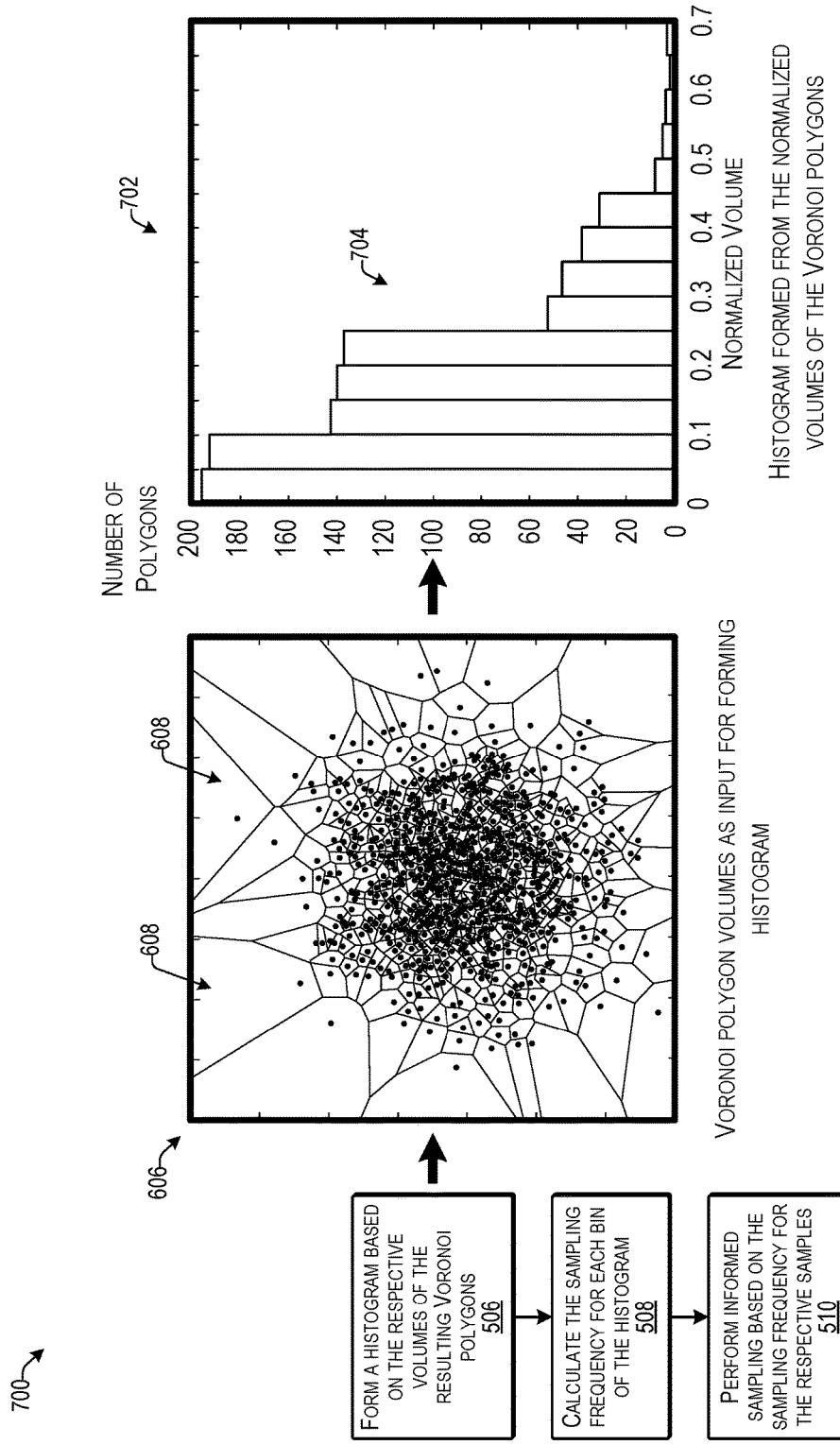
FIG. 7 illustrates an example of determining a histogram from normalized volumes of the Voronoi polygons according to some implementations.

FIG. 7 illustrates an example 700 of forming a histogram from normalized volumes of the Voronoi polygons according to some implementations. For example, the computing device may form a histogram 702 based on the respective normalized volumes of the plurality of Voronoi polygons 608 determined using the Voronoi tessellation. As one example, the volumes of the respective Voronoi polygons 608 may be efficiently acquired using a C++-based library called Qhull available from Qhull.org, and based in part on the paper "The Quickhull algorithm for convex hulls", ACM Trans. on Mathematical Software, 22(4):469-483, December 1996, which is incorporated herein by reference.

As illustrated in FIG. 7, Voronoi polygon volumes are determined for each Voronoi polygon 608 in the input sample set and normalized to a value, e.g., between 0 and 1. Based on normalized volumes and the number of polygons of each volume, a histogram 702 is constructed including a plurality of bins corresponding to the normalized volumes, e.g., 0-0.05 may be a first bin, 0.05-0.1 may be a second bin, and so forth. The sampling frequency for each bin 704 is determined corresponding to the number of polygons in each bin 704. Thus, the informed sampling may be performed based on the sampling frequency, which may be inverse to the number of respective samples in each bin 704.

Figure 8:
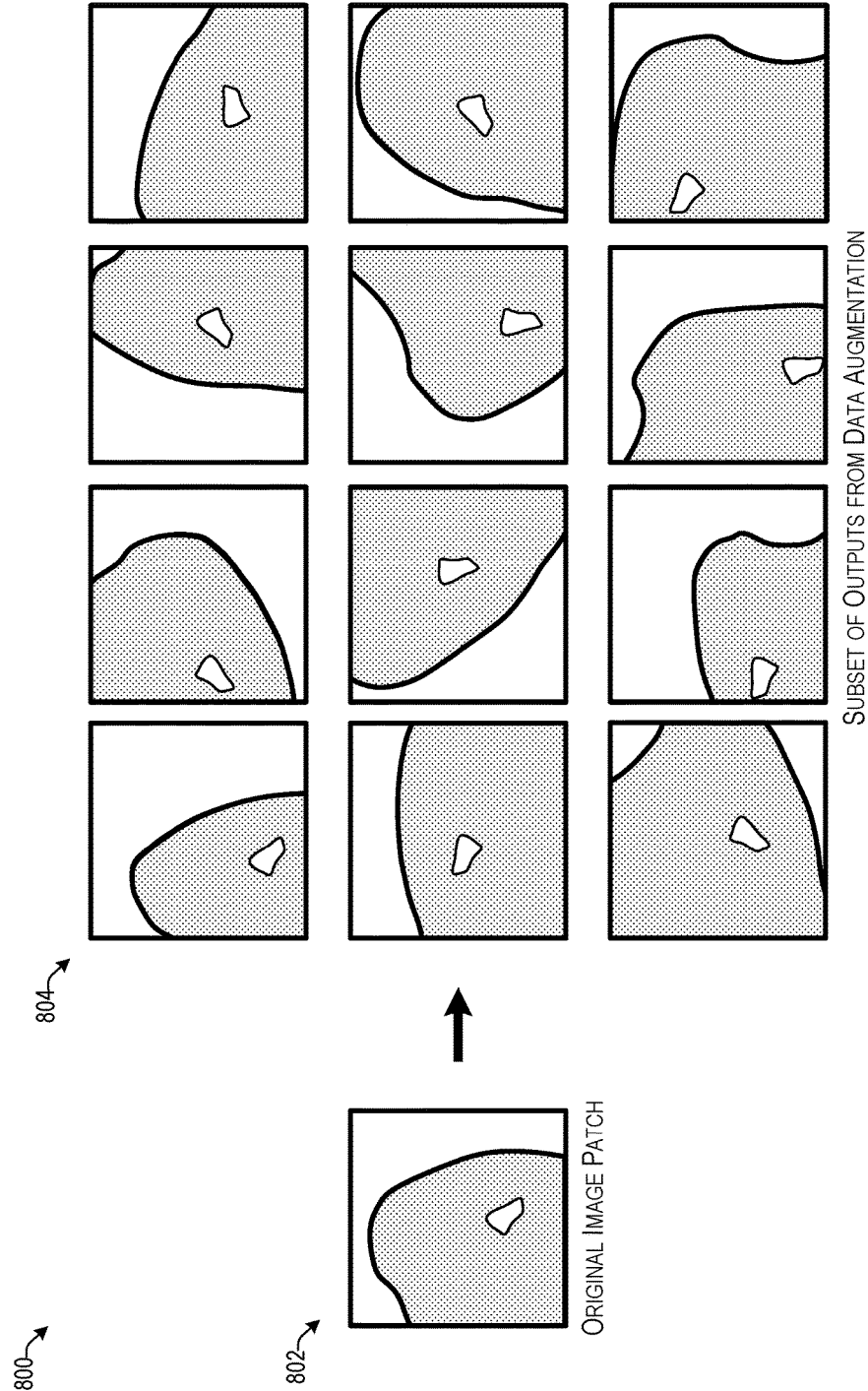
FIG. 8 illustrates an example of data augmentation for a sample image patch according to some implementations.

FIG. 8 illustrates an example 800 of data augmentation for a sample image patch according to some implementations. As mentioned above, the number of available minority (positive) samples $S_{min}$ may be substantially less than the number of majority (negative) samples. Accordingly, the model building program may perform data augmentation on the minority-class (positive) image patches to at least partially address the imbalance between the minority class and the majority class. As one example, the model building program may increase the variance and cardinality of $S_{min}$ by applying data augmentation techniques described herein. Mathematically this operation may be expressed as:

$$|S_{maj}|=|\Xi\{S_{min}\}|$$

where $\Xi\{\bullet\}$ denotes a data augmentation operator that includes one or more of the following operations: (1) translation along the horizontal and/or vertical directions; (2) flipping along the horizontal and/or vertical directions; (3) zooming and/or cropping with a random factor between 0.9 and 1.1; (4) rotation with a random angle between 0° and 359°, and (5) voxel intensity rescaling with a random factor between 0.9 and 1.1. The these operations not only increase the number of elements in $S_{min}$, but also maintain a moderate level of variance between the elements.

In the illustrated example, an original image patch 802 may be used for data augmentation by applying one or more of the operations discussed above to produce a plurality of new image patches 804 that may be augmented data added to the original training data for increasing the number of samples in the minority (positive) data class. Thus, the new image patches 804 are created by at least one of translation of image patch 802 along the horizontal and/or vertical directions; flipping image patch 802 along the horizontal and/or vertical directions; zooming and/or cropping image patch 802 with a random factor; rotation of image patch 802 with a random angle; and/or rescaling voxel intensity of image patch 802 with a random factor. Further, while 16 new image patches 804 are illustrated in this example, more or fewer new image patches 804 may be generated in other examples. As one example, the number of new image patches from each minority class sample may be determined so that the total number of minority samples plus the total number of new samples in the augmented data equals the total number of samples to be taken from the majority class, although there is no requirement that the minority class size be made to equal the majority class size.

Figure 9:
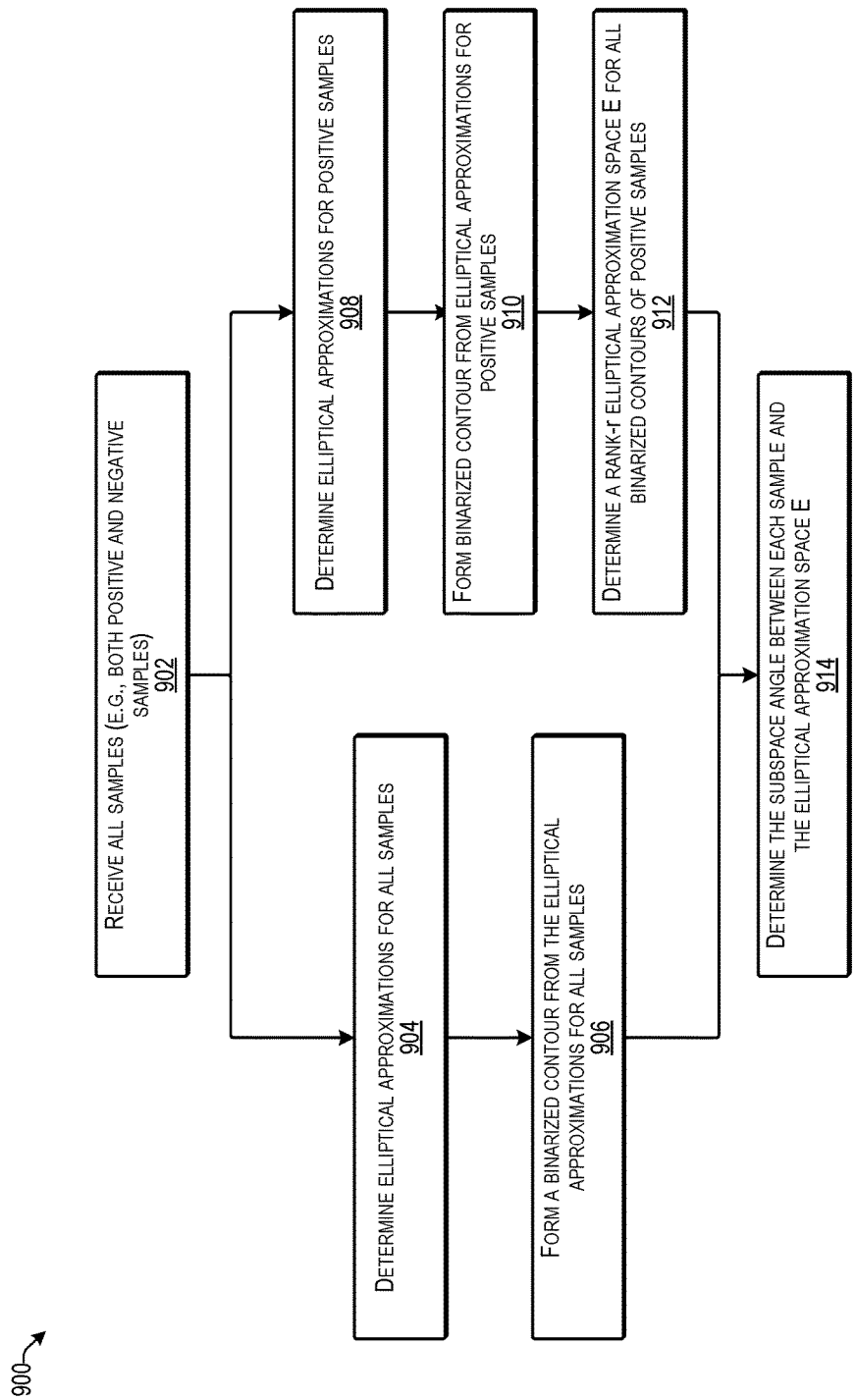
FIG. 9 is a flow diagram illustrating an example process 900 for determining an angle to an elliptical approximation space according to some implementations.

FIG. 9 is a flow diagram illustrating an example process 900 for determining an angle to an elliptical approximation space according to some implementations. For instance, when generating the false positive reduction MLM, an example overall approach may include extracting image features from the image patches to form a feature vector, and then applying gradient boosting to the feature vector to determine lung nodules from false positive nodule identifications.

Feature extraction may significantly affect the construction of an effective false positive reduction MLM for false positive reduction. In some examples, the extracted features may have strong representation power to differentiate true nodules from their false positive counterparts, while also including robustness to physiological variations in both shapes and boundaries. As illustrated in FIG. 9, determining the angle to the elliptical approximation space may be performed according to the process 900, as follows.

At 902, the computing device may receive all samples (e.g., both positive and negative samples). For example, the computing device may receive a training data set that includes both positive and negative samples. In some cases, the training data set may include augmented data for the positive samples, e.g., as discussed above with respect to FIG. 8.

At 904, the computing device may determine elliptical approximations for all samples in the training data set. For example, the computing device may determine elliptical approximations of any identified lung nodules for all samples. Elliptical approximation can be determined for both positive and negative samples, but the extracted subspaces are different. For example, operations 904 and 906 encompass both positive and negative samples, while operations 908, 910, and 912, as discussed below, are performed only on positive samples. For example, a subspace angle can be determined between each sample from the left path (operations 904 and 906), as versus to the subspace angle from the right path (operations 908, 910, and 912). Positive samples may typically have lower subspace angles, while negative samples will tend to have large subspace angles. Additional details of determining an elliptical approximation are discussed below with respect to FIG. 10.

At 906, the computing device may form a binarized contour from the elliptical approximations for all samples. Form binarized contours of lung nodules from the elliptical approximations. Additional details of forming a binarized contour are discussed below with respect to FIG. 11.

At 908, the computing device may determine elliptical approximations for the positive samples. For example, for each positive sample, the computing device may determine an elliptical approximation for that sample. Additional details of determining an elliptical approximation are discussed below with respect to FIG. 10.

At 910, the computing device may form binarized contour from elliptical approximations for positive samples. Form binarized contours of lung nodules from the elliptical approximations. Additional details of forming a binarized contour are discussed below with respect to FIG. 11.

At 912, the computing device may determine a rank-r subspace for all binarized contours of positive samples. For example, the computing device may form a rank-r approximation of the binarized contours (from the positive samples) to determine an elliptical approximation space E. As one example, the rank-r approximation may be determined using a truncated singular value decomposition routine in the RedSVD library, a PYTHON® programming language library for fast randomized SVD calculations. Alternative techniques will be apparent to those of skill in the art having the benefit of the disclosure herein.

At 914, the computing device may determine the angle between each sample and the elliptical approximation space E. For example, the computing device may calculate the angle $\theta_{s,E}$ between each approximated selected sample and the elliptical approximation space E. Additional details for determining the angle to the elliptical approximation space E are discussed with respect to FIG. 12 below.

Figure 10:
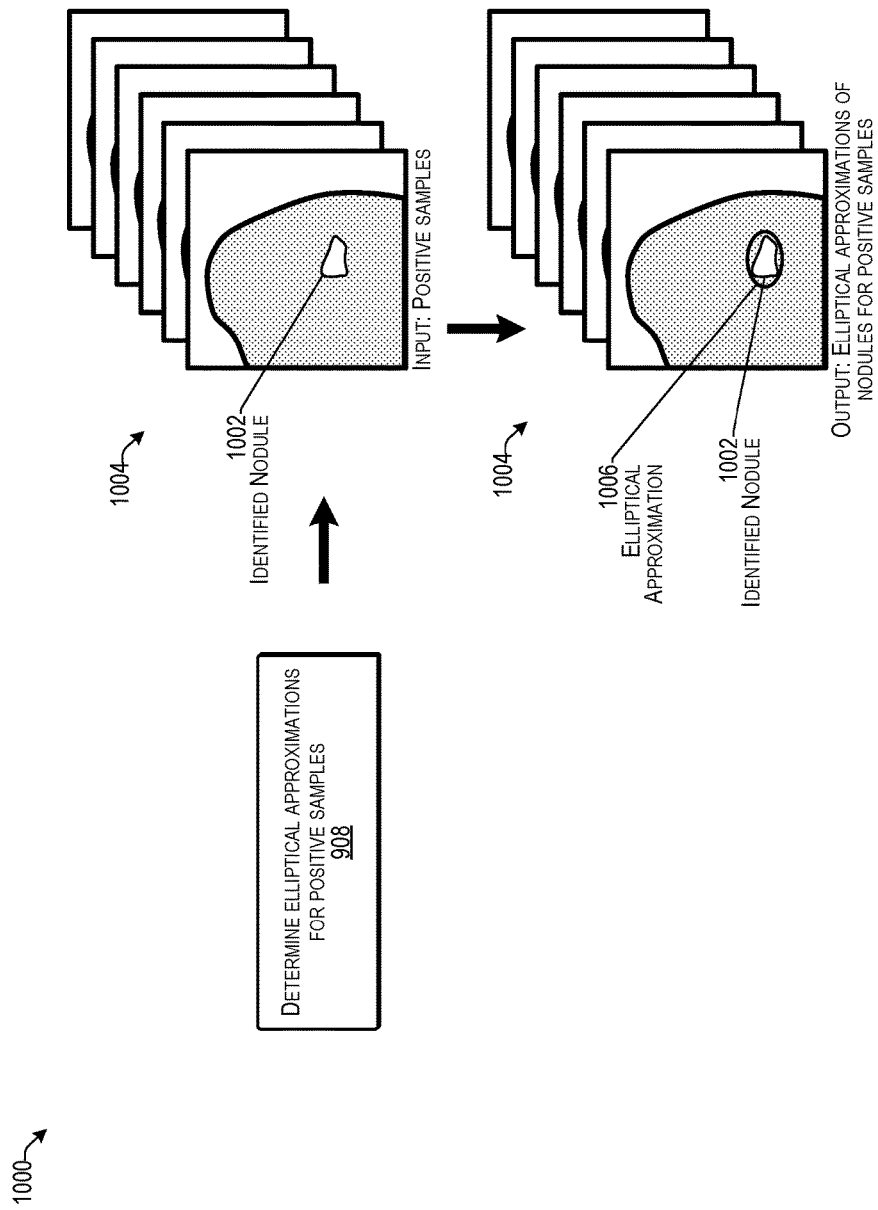
FIG. 10 illustrates an example of calculating elliptical approximations for positive samples according to some implementations.

FIG. 10 illustrates an example 1000 of calculating elliptical approximations for positive samples according to some implementations. As discussed above at 908, the computing device may determine elliptical approximations for nodules 1002 identified in positive samples 1004. For example, for each positive sample, the computing device may determine the location and outline of the identified nodule(s) 1002, and may determine an elliptical approximation 1006 of each respective nodule 1002. For example, the elliptical approximation 1006 may include an ellipse that encompasses the nodule 1002 and that is sized according to the outline of the nodule 1002, e.g., the ellipse may contact the outline of the nodule 1002 in at least two places, or alternatively, may be slightly larger than the outline of the nodule 1002.

Figure 11:
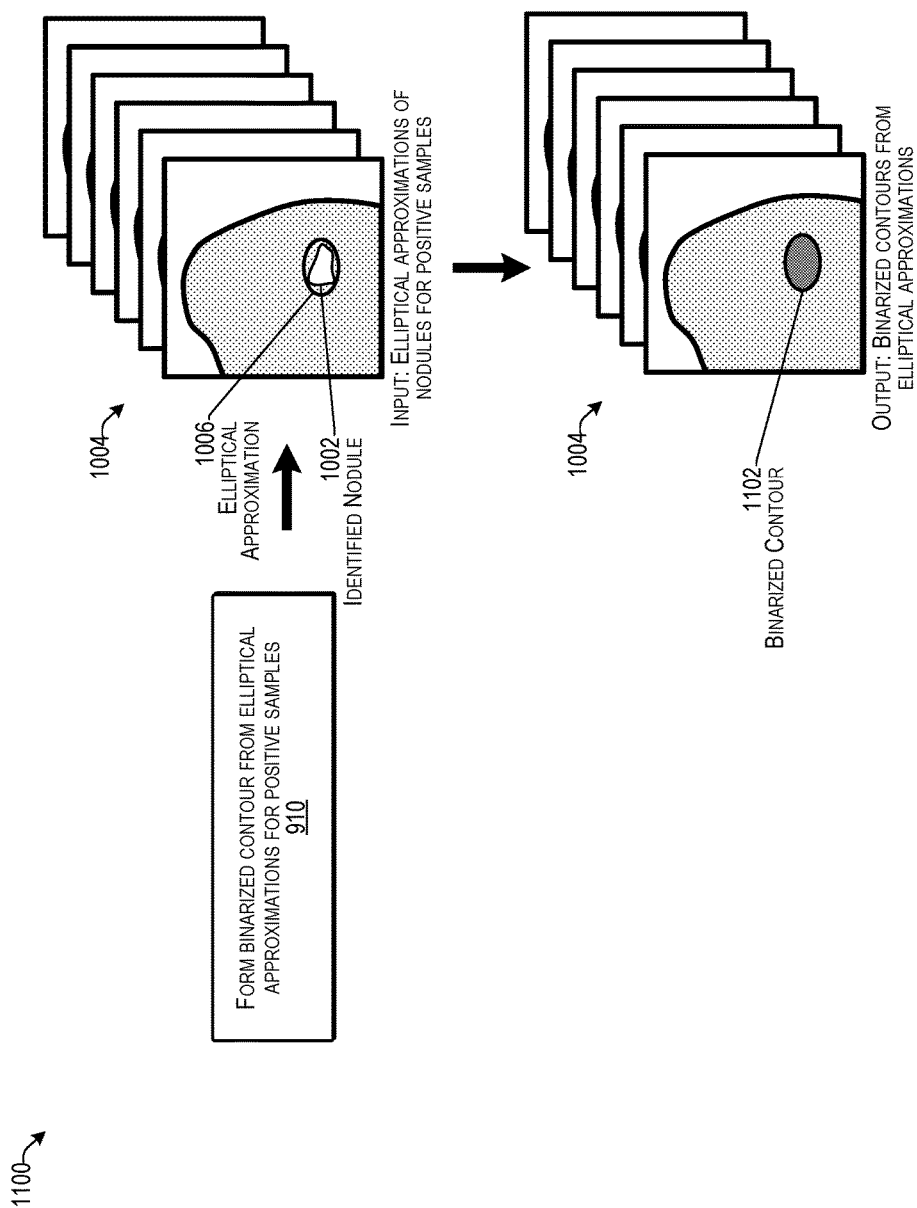
FIG. 11 illustrates an example of forming binarized contours from elliptical approximations according to some implementations.

FIG. 11 illustrates an example 1100 of forming a binarized contour from an elliptical approximation according to some implementations. For example, the elliptical approximation 1106 of each identified nodule 1002 for the positive samples 1004 may be received as an input for the operation, and the output may be a binarized contour 1102, e.g., an ellipse having a known location in the corresponding image sample and having known dimensions and axes.

Figure 12:
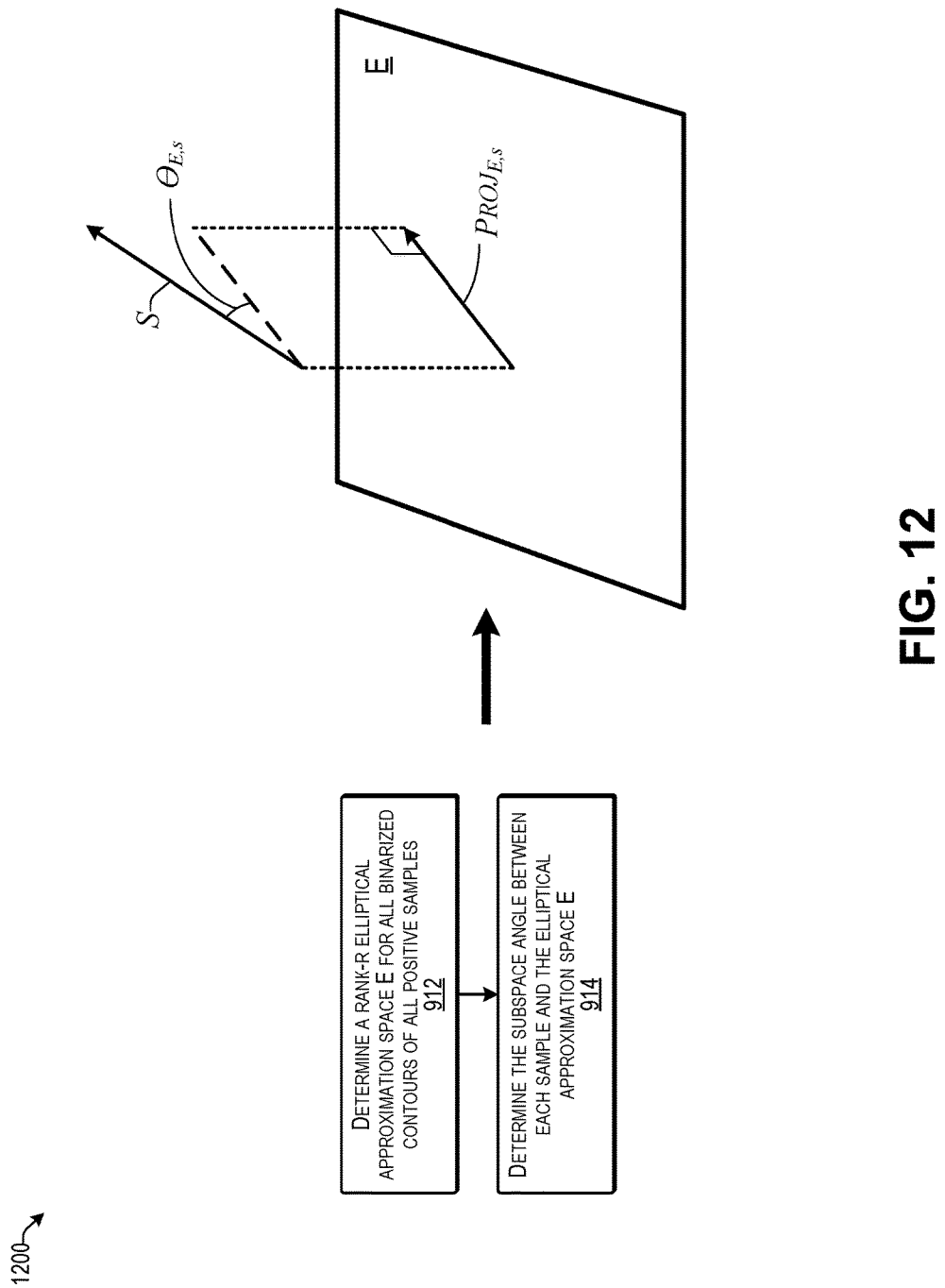
FIG. 12 illustrates an example of calculating an angle to the elliptical approximation space according to some implementations.

FIG. 12 illustrates an example 1200 of determining an angle to the elliptical approximation space according to some implementations. For instance, as discussed with respect to 912 of FIG. 9 above, the model building program may determine a rank-r elliptical approximation space E for all binarized contours of all positive samples. As one example, the elliptical approximation space E=span $\{e_1, \ldots, e_r\}$, which is the subspace of the elliptical approximations to the positive samples of the lung nodules, and $\{e_i\}_{i=1}^{r}$ represents the basis functions for this subspace.

Furthermore, as discussed above with respect to 914 of FIG. 9 above, the model building program may determine the subspace angle $\theta_{s,E}$ between each approximated sample and the elliptical approximation space E. For example, assuming s is a contour of the elliptical approximation to a selected sample, the subspace angle $\theta_{E,s}$ may be defined between s and its projection onto the elliptical approximation space E. The subspace angle $\theta_{E,s}$ may serve as a natural metric to measure the similarity of the selected sample versus the collective geometric features of all the positive samples. Thus, applying the subspace angle $\theta_{s,E}$ as a metric is novel and unconventional at least because the elliptical approximation space E is defined on the elliptical approximation to the positive samples, and not on the positive samples themselves. This metric reduces the influence of noise, contrast, and geometric distortion on the calculation of the subspace angle $\theta_{s,E}$, and thereby reduces computing requirements and improves operation of the system when performing nodule detection. Accordingly, the false positive reduction MLM herein provides a specific implementation of a solution to a problem in the software arts that improves the capability of the computing device and the system as a whole when executing the nodule detection process discussed above with respect to FIG. 2.

FIG. 13 illustrates an example data structure 1300 including features extracted from image patches according to some implementations. The above-mentioned subspace angle metric (subspace angle $\theta_{s,E}$ to elliptical approximation space E) may be used as a feature and further may be combined with other extracted image features to improve performance and robustness of the false positive reduction MLM. In some examples herein, up to 16 types of image features from 6 categories may be determined from each resampled image patch to form a high dimensional feature vector. The gradient boosting model may be applied using the resulting feature vector to discriminate lung nodules from their false positive counterparts in a high dimensional feature space. In the illustrated example, the data structure 1300 includes a feature number column 1302, a feature category column 1304, a feature name column 1360, and a feature definition column 1308.

Accordingly, in addition to using the angle to the elliptical approximation space, some implementations herein may include one or more additional features of 15 potential additional features corresponding to 5 feature categories, namely: (1) grayscale distribution features; (2) geometry features; (3) histogram-of-oriented-gradients features; (4)

Hessian-matrix-based features; and (5) local-binary-pattern-based features. As illustrated in FIG. 13, details of these features include the following:

Grayscale distribution features—this category of features involves statistics of the grayscale values of the image patch of interest. In particular, the voxel intensity, minimum, maximum, mode, median, and standard deviation of the grayscale values are included.

Geometry features—this category of features are obtained by forming an elliptical approximation to the geometric shape of the nodule. Specifically, the minor and major axes lengths, the compactness of the nodule (the ratio of the volume of nodule within the elliptical object), and the associated Euler characteristic number are included.

Histogram-of-oriented-gradients features—this category of features aims to represent the local shape variation from sub-regions within an image patch through a histogram of oriented gradients. Some implementations herein may apply a multi-resolution approach in which cell sizes of 4×4, 8×8, and 16×16 are used, and the resulting features are concatenated in a column-wise fashion to form a feature vector.

Hessian-matrix-based features—this category of features targets at capturing the edge and ridge features in the image patch by using Hessian analysis. Some examples may focus on the minimum and maximum eigenvalues of the Hessian matrix, and the ratio between the two eigenvalues.

Local-binary-pattern-based features—this category of features may use local binary pattern features to capture texture differences in the nodules. A similar multi-resolution approach, covering cell sizes of 4×4, 8×8, and 16×16, may be used here as well, and the resulting features may be concatenated to form a column vector.

Figure 14:
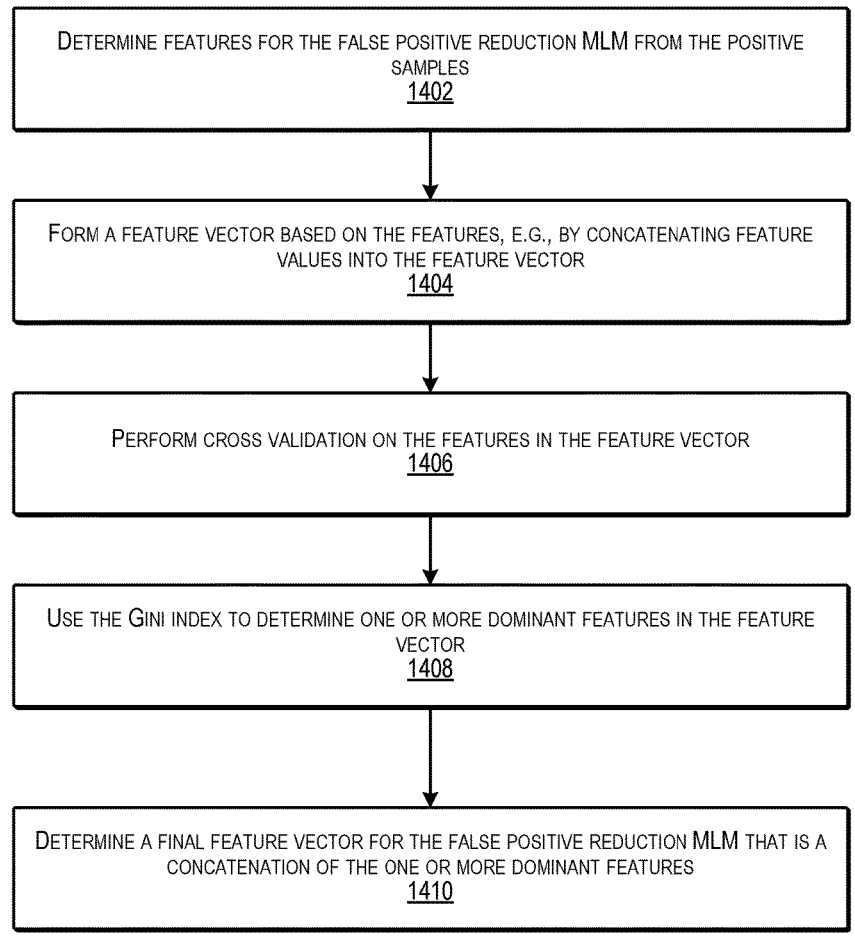
FIG. 14 is a flow diagram illustrating an example process for combining features in the false positive reduction machine learning model according to some implementations.

FIG. 14 is a flow diagram illustrating an example process 1400 for applying multiple features in the false positive reduction MLM according to some implementations. In some examples, the process 1400 may be executed by the service computing device 102 or other suitable computing device.

At 1402, the computing device may determine features for the false positive reduction MLM from the positive samples. Examples of features are discussed above with respect to FIG. 13.

At 1404, the computing device may form a feature vector based on the features. For example, the feature values may be concatenated into the feature vector.

At 1406, the computing device may perform cross validation on the features in the feature vector. For example, the cross validation be used to determine how well the false positive reduction MLM extends to an independent dataset. As one example, the cross validation herein may include partitioning a sample of data into complementary subsets, performing model prediction on the training dataset, and validating the analysis using the validation dataset. To reduce variability, k-fold (k-steps) of cross-validation may be performed using different, but equal, partitions of the data set to estimate the performance of the model.

At 1408, the computing device may use Gini index to determine one or more dominant features. For instance, the Gini index may rank the features from most dominant to least dominant. As an example, the subspace angle may be the most dominant feature; however, one or more other features may also be significant.

At 1410, the computing device may determine a final feature vector for the false positive reduction MLM that is a concatenation of the one or more dominant features identified by the Gini index.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, the implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Figure 15:
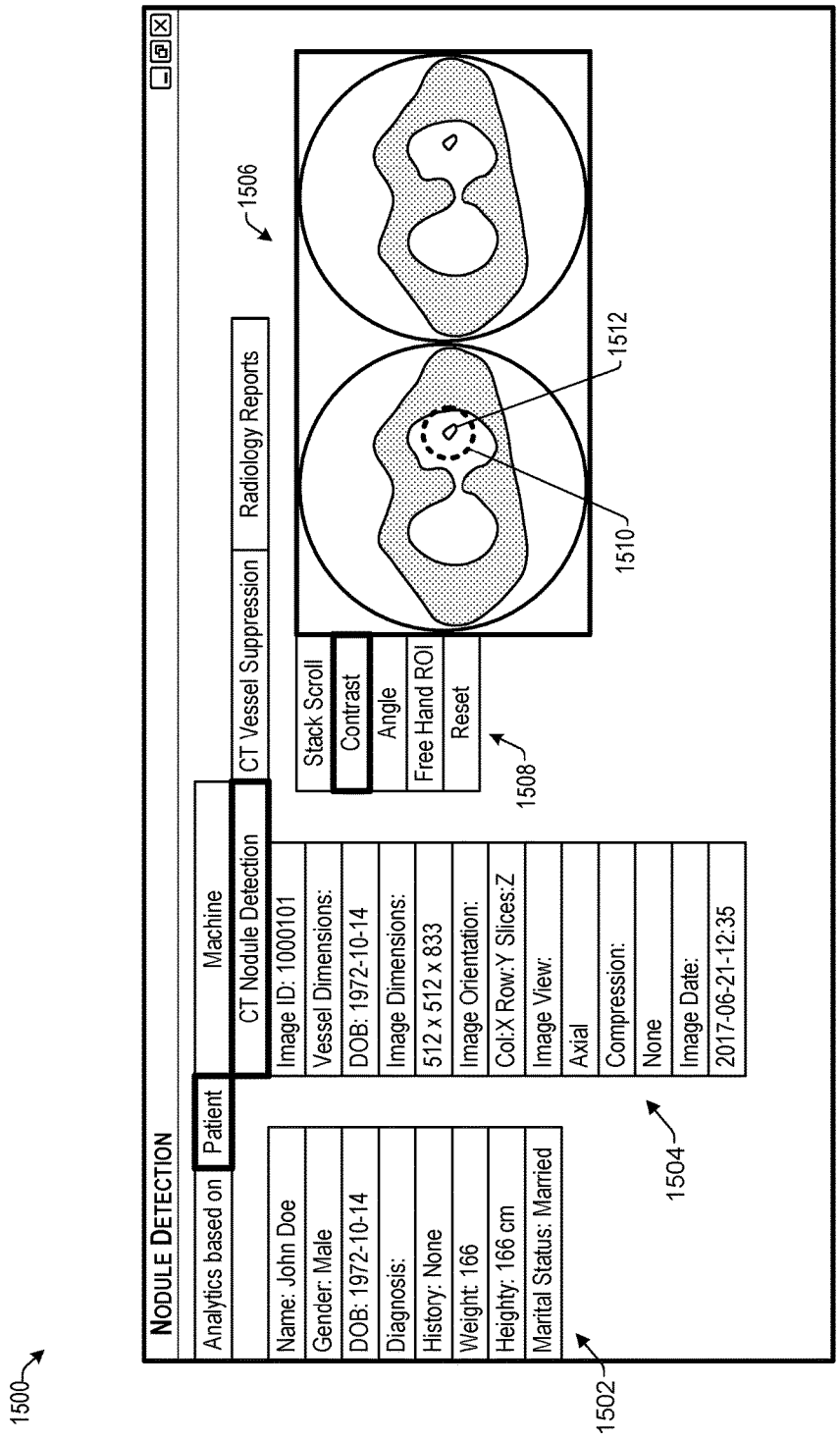
FIG. 15 illustrates an example user interface for nodule detection according to some implementations.

FIG. 15 illustrates an example user interface 1500 for presenting and visualizing locations of identified nodules according to some implementations. In this example, as discussed above with respect to FIG. 1, a user may invoke the nodule identifying program through an image viewing program. In some cases, the image viewing program may be or may include a browser on the user computing device that may be used to access the images of a selected patient, and which may present the user interface 1500. In other examples, the image viewer program may be a dedicated image viewing program that is executed on the user computing device.

In the illustrated example, the user interface 1500 includes patient identifying information 1502, image identifying information 1504, an image or other visualization 1506, and corresponding image control settings 1508. As one example, the user may select an image or set of images for a patient, which may invoke the nodule identifying program to perform nodule detection on the corresponding set of images. As discussed above with respect to FIGS. 1 and 2, the nodule identifying program performs nodule detection to preliminarily identify nodule locations. The nodule identifying program may then use the false positive reduction MLM herein to perform false positive reduction, and may return enhanced image information, which may include location information about a located nodule. The image viewing program may present the enhanced image information, such as by presenting a bounding box around the nodule, or other visually distinguishing feature 1510 in the user interface 1500 to highlight the location of the located nodule 1512 to the user. Furthermore, while an example user interface and techniques for visualization are described herein, numerous other variations will be apparent to those of skill in the art having the benefit of the disclosure herein.

Various instructions, processes, and techniques described herein may be considered in the general context of computer-executable instructions, such as programs stored on computer-readable media, and executed by the processor(s) herein. Generally, programs include computer-readable instructions, routines, modules, applications, objects, components, data structures, executable code, etc., for performing particular tasks or implementing particular abstract data types. These programs and the like may be executed as native code or may be downloaded and executed, such as in a virtual machine or other just-in-time compilation execution environment. Typically, the functionality of the programs may be combined or distributed as desired in various implementations. An implementation of these programs and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed:

1. A system comprising:
one or more processors; and
one or more non-transitory computer-readable media maintaining executable instructions, which, when executed by the one or more processors, program the one or more processors to perform operations comprising:
training a false positive reduction machine learning model, wherein the false positive reduction machine learning model utilizes at least one feature based on determining a subspace angle between an elliptical approximation in a selected image and an elliptical approximation space determined for a plurality of image samples;
receiving a plurality of images for performing nodule identification;
inputting the plurality of images to a nodule detection machine learning model to perform preliminary detection of a nodule in one or more images of the plurality of images;
inputting the one or more images and nodule location information from the nodule detection machine learning model to the false positive reduction machine learning model, wherein the false positive reduction machine learning model outputs an indication of correctness of the preliminary detection of the nodule; and
based on the false positive reduction machine learning model indicating that the preliminary detection of the nodule is correct, sending enhanced image information to a visualization program, the enhanced image information including at least an indication of a location of the nodule in the one or more images.

2. The system as recited in claim 1, wherein the operation of training the false positive reduction machine learning model further comprises:
receiving training data images and associated indications of nodule locations;
determining a first set of the training data images that include indications of nodule locations and a second set of the training data images that do not include an indication of nodule locations; and
determining a plurality of training data sets from the training data images, each training data set including a plurality of images from the first set and a plurality of images from the second set.

3. The system as recited in claim 2, wherein the operation of determining the plurality of training data sets further comprises:
determining relative locations of respective images of the second set in an image volume;
performing Voronoi tessellation on the respective locations of the respective images determine a plurality of Voronoi polygons; and
determining a sampling frequency for performing informed sampling of the second set based on respective volumes of the plurality of Voronoi polygons to obtain a sampling of the training data images of the second set for the plurality of data sets.

4. The system as recited in claim 3, wherein the operation of determining a sampling frequency for performing informed sampling of the second set based on respective volumes of the plurality of Voronoi polygons further comprises:
determining a histogram based on the respective volumes of the plurality of Voronoi polygons, the histogram including a plurality of bins corresponding to different ranges of the respective volumes; and
determining respective sampling frequencies for individual bins, wherein the respective sampling frequencies are inversely proportional to heights of the individual bins.

5. The system as recited in claim 2, wherein the operation of determining the plurality of training data sets further comprises performing data augmentation using a selected image from the first set of training data images by at least one of:
translation of the selected image along a horizontal and/or vertical direction;
flipping the selected image along the horizontal and/or vertical axis;
zooming and/or cropping the selected image;
rotating the selected image to an angle; and/or
rescaling voxel intensity of the selected image with a factor.

6. The system as recited in claim 1, wherein the operation of training the false positive reduction machine learning model further comprises:
determining elliptical approximations for nodules in images in the first set;
determining respective binarized contours from the elliptical approximations;
determining an elliptical approximation space for the binarized contours in the first set; and
determining a subspace angle between an elliptical approximation determined for a selected image of the first set and the elliptical approximation space.

7. The system as recited in claim 1, wherein the false positive reduction machine learning model further includes at least one additional feature comprising:
a grayscale distribution feature;
a geometry feature;
a histogram of oriented gradients feature;
a Hessian matrix based feature; or
a local binary pattern feature.

8. The system as recited in claim 1, the operations further comprising:
receiving, via a user interface presented on a user device, an indication of the plurality of images for performing the nodule identification; and
sending, to the user device, the enhanced image information to cause, at least in part, the user device to present the enhanced image information on the user interface to provide a visual indication of the location of the nodule.

9. The system as recited in claim 1, wherein the false positive reduction machine learning model comprises a gradient boosting model, the operation of training the false positive reduction machine learning model further comprising tuning parameters of the gradient boosting model using a randomized search technique.

10. A method comprising:
receiving, by one or more processors, training data images and associated indications of nodule locations;
determining, by the one or more processors, a first set of the training data images that include indications of nodule locations and a second set of the training data images that do not include an indication of nodule locations;

determining, by the one or more processors, elliptical approximations for nodules in images in the first set;

determining, by the one or more processors, an elliptical approximation space for the elliptical approximations in the first set;

determining, by the one or more processors, a subspace angle between individual image samples in the first set and the elliptical approximation space as at least one feature of a machine learning model;

receiving, by the one or more processors, one or more images for performing nodule identification;

inputting, by the one or more processors, the one or more images to the machine learning model to determine whether an indication of a nodule is accurate; and based on an output of the machine learning model indicating that the indication of the nodule is accurate, associating, by the one or more processors, enhanced image information with the at least one image for providing a visualization of a location of the nodule.

11. The method as recited in claim 10, further comprising determining, by the one or more processors, a training data set including images from the first set and images from the second set by:

determining relative locations in an image volume of respective images in the second set of images;

performing Voronoi tessellation on the relative locations of the respective images to determine a plurality of Voronoi polygons; and determining a sampling frequency for performing informed sampling of the second set based on respective volumes of the plurality of Voronoi polygons.

12. The method as recited in claim 11, further comprising determining the sampling frequency for performing the informed sampling of the second set based on the respective volumes of the plurality of Voronoi polygons by:

determining a histogram based on the respective volumes of the plurality of Voronoi polygons, the histogram including a plurality of bins corresponding to different ranges of the respective volumes; and determining respective sampling frequencies for individual bins of the plurality of bins, wherein the respective sampling frequencies are inversely proportional to heights of the individual bins.

13. The method as recited in claim 11, further comprising determining the training data set by performing data augmentation for a selected image of the first set of the training data images by at least one of:

translation of the selected image along a horizontal and/or vertical direction;

flipping the selected image along the horizontal and/or vertical axis;

zooming and/or cropping the selected image;

rotating the selected image to an angle; or rescaling voxel intensity of the selected image with a factor.

14. The method as recited in claim 13, further comprising:

receiving, by the one or more processors, via a user interface presented on a user device, an indication of the plurality of images for performing the nodule identification; and sending, by the one or more processors, to the user device, the enhanced image information to cause, at least in part, the user device to present the enhanced image information on the user interface to provide a visual indication of the location of the nodule.

15. One or more non-transitory computer-readable media storing instructions which, when executed by one or more processors, program the one or more processors to:

receive training data images and associated indications of nodule locations;

determining, by the one or more processors, a first set of the training data images that include indications of nodule locations and a second set of the training data images that do not include an indication of nodule locations;

determining relative locations in an image volume of respective images in the second set of images;

performing Voronoi tessellation on the relative locations of the respective images to determine a plurality of Voronoi polygons; and selecting images from the second set based on a sampling frequency determined based on respective volumes of the plurality of Voronoi polygons;

training a machine learning model using, as a training data set, images selected from the first set and the images selected from the second set based on the sampling frequency;

receiving, by the one or more processors, one or more images for performing nodule identification;

inputting, by the one or more processors, the one or more images to the machine learning model to determine whether an indication of a nodule is accurate; and based on an output of the machine learning model indicating that the indication of the nodule is accurate, associating, by the one or more processors, enhanced image information with the at least one image for providing a visualization of a location of the nodule.

16. The one or more non-transitory computer-readable media as recited in claim 15, wherein the one or more processors are further programmed to determine the sampling frequency for selecting the images from the second set based on the respective volumes of the plurality of Voronoi polygons by:

determining a histogram based on the respective volumes of the plurality of Voronoi polygons, the histogram including a plurality of bins corresponding to different ranges of the respective volumes; and determining respective sampling frequencies for individual bins of the plurality of bins, wherein the respective sampling frequencies are inversely proportional to heights of the individual bins.

17. The one or more non-transitory computer-readable media as recited in claim 15, wherein the one or more processors are further programmed to:

determine elliptical approximations for nodules in images in the first set;

determine an elliptical approximation space for the elliptical approximations in the first set; and determine a subspace angle between individual image samples in the first set and the elliptical approximation space as at least one feature of a machine learning model.

18. The one or more non-transitory computer-readable media as recited in claim 17, wherein the one or more processors are further programmed to generate the machine learning model with at least one additional feature comprising:

a grayscale distribution feature;

a geometry feature;

a histogram of oriented gradients feature;

a Hessian matrix based feature; or a local binary pattern feature.

19. The one or more non-transitory computer-readable media as recited in claim 15, wherein the one or more processors are further programmed to select at least one of the images in the training data set by performing data augmentation for a first image of the first set of the training data images by at least one of:
- translation of the first image along a horizontal and/or vertical direction;
- flipping the first image along the horizontal and/or vertical axis;
- zooming and/or cropping the first image;
- rotating the first image to an angle; or
- rescaling voxel intensity of the first image with a factor.

20. The one or more non-transitory computer-readable media as recited in claim 15, wherein the one or more processors are further programmed to:
- receive, via a user interface presented on a user device, an indication of the plurality of images for performing the nodule identification; and
- send, to the user device, the enhanced image information to cause, at least in part, the user device to present the enhanced image information on the user interface to provide a visual indication of the location of the nodule.

* * * * *